United States Patent
Ito

(10) Patent No.: US 8,619,851 B2
(45) Date of Patent: Dec. 31, 2013

(54) INFORMATION DISTRIBUTION APPARATUS, INFORMATION DISTRIBUTION METHOD, AND INFORMATION DISTRIBUTION PROGRAM

(75) Inventor: Hiroyasu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1334 days.

(21) Appl. No.: 12/039,071

(22) Filed: Feb. 28, 2008

(65) Prior Publication Data

US 2008/0212670 A1   Sep. 4, 2008

(30) Foreign Application Priority Data

Mar. 1, 2007 (JP) .................................. 2007-051576

(51) Int. Cl.
*H04N 7/12* (2006.01)
*H04N 11/02* (2006.01)
*H04N 11/04* (2006.01)

(52) U.S. Cl.
USPC .............. 375/240.01; 375/240.03; 375/240.1; 375/240.13; 348/423.1; 348/424.2

(58) Field of Classification Search
USPC ...................... 375/240–241; 348/423.1, 424.2
See application file for complete search history.

(56) References Cited

U.S. PATENT DOCUMENTS

| | | | |
|---|---|---|---|
| 6,353,613 B1 * | 3/2002 | Kubota et al. .................. | 370/389 |
| 6,721,249 B2 * | 4/2004 | Jung et al. .................... | 369/47.16 |
| 2003/0112834 A1 * | 6/2003 | Karasawa ....................... | 370/537 |
| 2004/0258060 A1 * | 12/2004 | Liu et al. ....................... | 370/389 |
| 2005/0027786 A1 * | 2/2005 | Kim et al. ...................... | 709/200 |
| 2005/0152546 A1 * | 7/2005 | Kangas ......................... | 380/210 |
| 2005/0180568 A1 * | 8/2005 | Krause .......................... | 380/212 |
| 2005/0207739 A1 * | 9/2005 | Kamio .......................... | 386/125 |
| 2006/0023755 A1 * | 2/2006 | Tatsumi et al. ................ | 370/535 |
| 2007/0022454 A1 * | 1/2007 | Yoon et al. .................... | 725/100 |
| 2007/0183454 A1 * | 8/2007 | Kim et al. ...................... | 370/486 |
| 2007/0263860 A1 * | 11/2007 | Buchen et al. ................. | 380/42 |
| 2008/0068507 A1 * | 3/2008 | Krause et al. ................. | 348/570 |
| 2008/0141323 A1 * | 6/2008 | Munetsugu et al. .......... | 725/115 |
| 2008/0212670 A1 * | 9/2008 | Ito ............................ | 375/240.01 |
| 2008/0254826 A1 * | 10/2008 | Kwon ........................ | 455/556.1 |

FOREIGN PATENT DOCUMENTS

| | | |
|---|---|---|
| JP | 09-149399 A | 6/1997 |
| JP | 2004-023667 A | 1/2004 |
| JP | 2004-215126 A | 7/2004 |
| JP | 2005-072899 A | 3/2005 |
| JP | 2005-268946 A | 9/2005 |
| WO | 2005/004474 A | 1/2005 |
| WO | 2005/004474 A1 | 1/2005 |

OTHER PUBLICATIONS

Information technology-Generic coding of moving pictures and associated audio information: Systems, ISO/IEC 13818-1, Second edition Dec. 1, 2000, pp. 1-177. (See attached document for list of relevant page numbers in the specification).

* cited by examiner

*Primary Examiner* — Benjamin H Elliott, IV

(74) *Attorney, Agent, or Firm* — Canon USA, Inc., I.P. Division

(57) ABSTRACT

An information distribution apparatus includes a determination unit configured to determine the configuration of a stream including video data and audio data, a creating unit configured to create combination information indicating combinations of video data and audio data making up the stream, based on the results of the determination, and a transmission unit configured to transmit the combination information to a reception apparatus.

11 Claims, 27 Drawing Sheets

| PID | TYPE |
|---|---|
| 0x0000 | PAT |
| 0x0001 | CAT |
| : | PMT, ELEMENTARY PID, ETC. |
| 0x1FFF | NULL |

FIG. 5A

PAT

| program_number | PID |
|---|---|
| 1 | 0x0080 |

FIG. 5B

PMT

| stream_type | PID |
|---|---|
| 0x02 | 0x0081 |
| 0x02 | 0x0082 |
| 0x04 | 0x0083 |
| 0x0F | 0x0084 |

FIG. 6
PRIOR ART

| stream_type | TYPE |
|---|---|
| 0x01 | MPEG-1 VIDEO |
| 0x02 | MPEG-2 VIDEO |
| 0x03 | MPEG-1 AUDIO |
| 0x04 | MPEG-2 AUDIO |
| 0x0F | MPEG-2AAC AUDIO |

FIG. 10

PMT  1001

| stream_type | PID |
|---|---|
| 0x02 | 0x0081 |
| 0x04 | 0x0083 |

PMT  1002

| stream_type | PID |
|---|---|
| 0x02 | 0x0082 |
| 0x04 | 0x0083 |

PMT  1003

| stream_type | PID |
|---|---|
| 0x02 | 0x0081 |
| 0x0F | 0x0084 |

PMT  1004

| stream_type | PID |
|---|---|
| 0x02 | 0x0082 |
| 0x0F | 0x0084 |

FIG. 15

```
<DIDL-Lite xmlns:dc="http://purl.org/dc/elements/1.1/"
 xmlns:upnp="urn:schemas-upnp-org:metadata-1-0/upnp/"
 xmlns="urn:schemas=upnp=org:metadata-1-0/DIDL-Lite/">

<item id="100"parentID="123"restricted="false">
  <dc:title>AAAA</dc:title>
  <dc:creator>xxxx</dc:creator>
  <upnp:class>object.otem.videoItem<upnp:class>
  <res protocolInfo="http-get:*:video/mpeg:*"size="100000">
      http://172.0.0.1/aaa.mpg
  </res>
  </item>

<item id="101"parentID="123"restricted="false">
  <dc:title>BBBB</dc:title>
  <dc:creator>xxxx</dc:creator>
  <upnp:class>object.otem.videoItem<upnp:class>
  <res protocolInfo="http-get:*:video/mpeg:*"size="50000">
      http://172.0.0.1/aaa.v001.a001.mpg
  </res>
  </item>

<item id="102"parentID="123"restricted="false">
  <dc:title>CCCC</dc:title>
  <dc:creator>xxxx</dc:creator>
  <upnp:class>object.otem.videoItem<upnp:class>
  <res protocolInfo="http-get:*:video/mpeg:*"size="50000">
      http://172.0.0.1/aaa.v001.a002.mpg
  </res>
  </item>

<item id="103"parentID="123"restricted="false">
  <dc:title>DDDD</dc:title>
  <dc:creator>xxxx</dc:creator>
  <upnp:class>object.otem.videoItem<upnp:class>
  <res protocolInfo="http-get:*:video/mpeg:*"size="50000">
      http://172.0.0.1/aaa.v002.a001.mpg
  </res>
  </item>

<item id="104"parentID="123"restricted="false">
  <dc:title>EEEE</dc:title>
  <dc:creator>xxxx</dc:creator>
  <upnp:class>object.otem.videoItem<upnp:class>
  <res protocolInfo="http-get:*:video/mpeg:*"size="50000">
      http://172.0.0.1/aaa.v002.a002.mpg
  </res>
  </item>

</DIDL-Lite>
```

1500

1501 — first item block
1502 — second item block
1503 — third item block
1504 — fourth item block
1505 — fifth item block

| stream_id | TYPE |
|---|---|
| 1011 1100 | program stream map |
| 1011 1101 | private stream 1 |
| 1011 1111 | private stream 2 |
| 110x xxxx | MPEG AUDIO |
| 1110 xxxx | MPEG VIDEO |
| 1111 1111 | program stream directory |

FIG. 26

| PID | TYPE |
|---|---|
| 0x0000 | PAT |
| 0x0012 | EIT |
| : | PMT, ELEMENTARY PID, ETC. |
| 0x1FFF | NULL |

FIG. 27

| |
|---|
| PAT (0x0000) |
| EIT (0x0012) |
| PMT (0x0080) |
| VIDEO 1 (0x0081) |
| VIDEO 2 (0x0082) |
| AUDIO 1 (0x0083) |
| AUDIO 2 (0x0084) |
| VIDEO 1 (0x0081) |
| VIDEO 2 (0x0082) |
| AUDIO 1 (0x0083) |
| AUDIO 2 (0x0084) |
| : |

FIG. 28

| PROGRAM TITLE | component_tag | TEXT INFORMATION |
|---|---|---|
| "MOVIE AAA" | 0x00 | "ANGLE 1" |
| | 0x01 | "ANGLE 2" |
| | 0x10 | "JAPANESE" |
| | 0x11 | "ENGLISH" |

| stream_type | PID | component_tag |
|---|---|---|
| 0x02 | 0x0081 | 0x00 |
| 0x02 | 0x0082 | 0x01 |
| 0x0F | 0x0083 | 0x10 |
| 0x0F | 0x0084 | 0x11 |

```
<DIDL-Lite xmlns:dc="http://purl.org/dc/elements/1.1/"
 xmlns:upnp="urn:schemas-upnp-org:metadata-1-0/upnp/"
 xmlns="urn:schemas=upnp=org:metadata-1-0/DIDL-Lite/">

<item id="100"parentID="123"restricted="false">       ⎫
    <dc:title>" MOVIE AAA"</dc:title>                     ⎪
    <dc:creator>xxxx</dc:creator>                         ⎪
    <upnp:class>object.otem.videoItem<upnp:class>         ⎬ 3001
    <res protocolInfo="http-get:*:video/mpeg:*"size="100000">⎪
        http://172.0.0.1/aaa.mpg                          ⎪
    </res>                                                ⎪
    </item>                                               ⎭

<item id="101"parentID="123"restricted="false">       ⎫
    <dc:title>" MOVIE AAA (ANGLE 1: JAPANESE)"</dc:title> ⎪
    <dc:creator>xxxx</dc:creator>                         ⎪
    <upnp:class>object.otem.videoItem<upnp:class>         ⎬ 3002
    <res protocolInfo="http-get:*:video/mpeg:*"size="50000">⎪
        http://172.0.0.1/aaa.v001.a001.mpg                ⎪
    </res>                                                ⎪
    </item>                                               ⎭

<item id="102"parentID="123"restricted="false">       ⎫
    <dc:title>" MOVIE AAA (ANGLE 1: ENGLISH)"</dc:title>  ⎪
    <dc:creator>xxxx</dc:creator>                         ⎪
    <upnp:class>object.otem.videoItem<upnp:class>         ⎬ 3003
    <res protocolInfo="http-get:*:video/mpeg:*"size="50000">⎪
        http://172.0.0.1/aaa.v001.a002.mpg                ⎪
    </res>                                                ⎪
    </item>                                               ⎭

<item id="103"parentID="123"restricted="false">       ⎫
    <dc:title>" MOVIE AAA (ANGLE 2: JAPANESE)"</dc:title> ⎪
    <dc:creator>xxxx</dc:creator>                         ⎪
    <upnp:class>object.otem.videoItem<upnp:class>         ⎬ 3004
    <res protocolInfo="http-get:*:video/mpeg:*"size="50000">⎪
        http://172.0.0.1/aaa.v002.a001.mpg                ⎪
    </res>                                                ⎪
    </item>                                               ⎭

<item id="104"parentID="123"restricted="false">       ⎫
    <dc:title>" MOVIE AAA (ANGLE 2: ENGLISH)"</dc:title>  ⎪
    <dc:creator>xxxx</dc:creator>                         ⎪
    <upnp:class>object.otem.videoItem<upnp:class>         ⎬ 3005
    <res protocolInfo="http-get:*:video/mpeg:*"size="50000">⎪
        http://172.0.0.1/aaa.v002.a002.mpg                ⎪
    </res>                                                ⎪
    </item>                                               ⎭

</DIDL-Lite>
```

3000

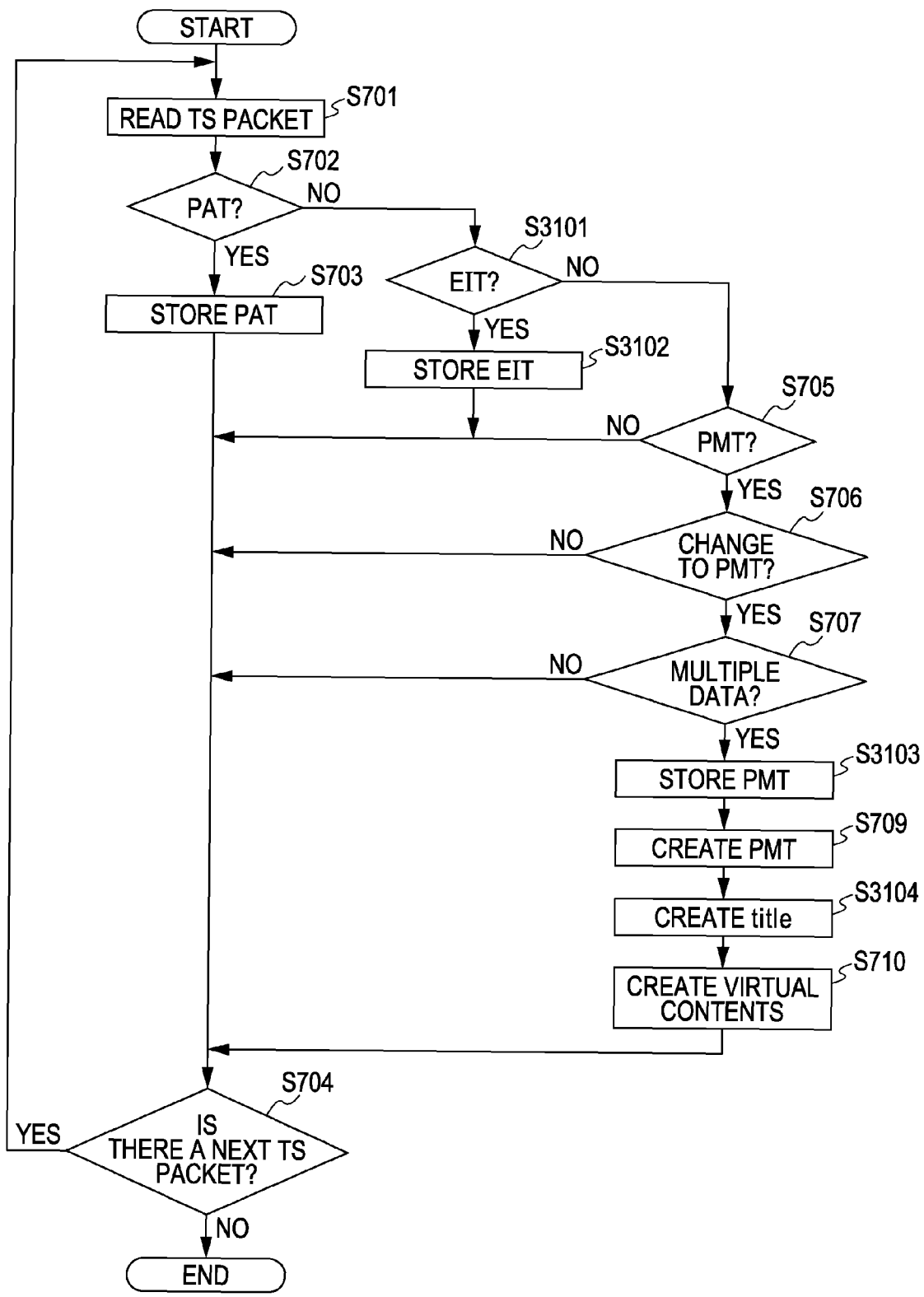

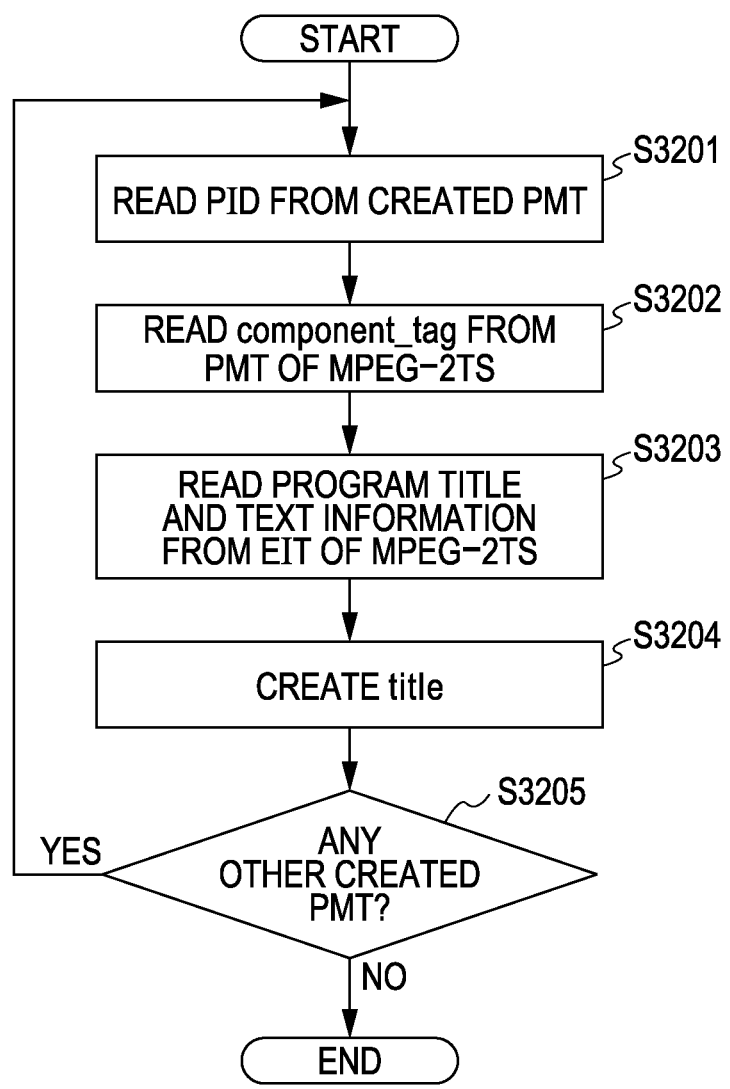

INFORMATION DISTRIBUTION APPARATUS, INFORMATION DISTRIBUTION METHOD, AND INFORMATION DISTRIBUTION PROGRAM

BACKGROUND OF THE INVENTION

1. Field of the Invention

The present invention relates to an information distribution apparatus which distributes information over a network.

2. Description of the Related Art

In recent years, playing multimedia streams stored in a server apparatus such as a media server, etc. (hereafter referred to as "stream") with a player apparatus connected via a network has come into widespread use.

One example of a guideline for playing streams over networks is DLNA (Digital Living Network Alliance). The DLNA guideline stipulates a method for presenting stream control information using an IFO file conformant to the DVD-VR Standard IFO file format at the time of playing a stream, with the player apparatus referring to this control information. Japanese Patent Laid-Open No. 2005-268946 states that information such as time stamps of the starting point and ending point of the stream, attributes of the video/audio of the stream, etc., are recorded in DVD-VR Standard IFO files.

However, with the DLNA guideline, usage of IFO files is an optional function, so not all reception apparatuses can handle this optional function. Accordingly, there have been reception apparatuses not capable of presenting time IFO-related stamps and attributes relating to the video data and audio data in the stream. Such reception apparatuses may not be able to play streams (video data and audio data) as desired.

SUMMARY OF THE INVENTION

The present invention provides for enabling presenting of information for selecting desired data from a stream containing multiple sets of video data and audio data, even with reception apparatuses not capable of using such as the above-mentioned IFO files.

An embodiment of the present invention is directed to an information distribution apparatus including a determination unit configured to determine the configuration of a stream including video data and audio data, a creating unit configured to, based on a determination result, create combination information indicating combinations of video data and audio data making up the stream, and a transmission unit configured to transmit the combination information to a reception apparatus.

According to this configuration, information for selecting desired data from a stream including multiple sets of video data and audio data can be presented to a reception apparatus on the network.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a diagram illustrating the configuration of a PAT.

FIG. 5B is a diagram illustrating the configuration of a PMT.

FIG. 6 is a diagram illustrating assigning of stream_type.

FIG. 10 is a diagram illustrating the configuration of created PMTs.

FIG. 15 is a diagram illustrating a content list.

FIG. 26 is a diagram illustrating assigning of PID.

FIG. 27 is a diagram illustrating the configuration of an MPEG-2 transport stream.

FIG. 28 is a diagram illustrating the configuration of an EIT.

FIG. 29 is a diagram illustrating the configuration of a PMT.

FIG. 30 is a diagram illustrating a content list.

FIG. 31 is a flowchart illustrating the processing of creating virtual contents.

FIG. 32 is a flowchart illustrating the processing of creating titles.

DESCRIPTION OF THE EMBODIMENTS

Figure 1:
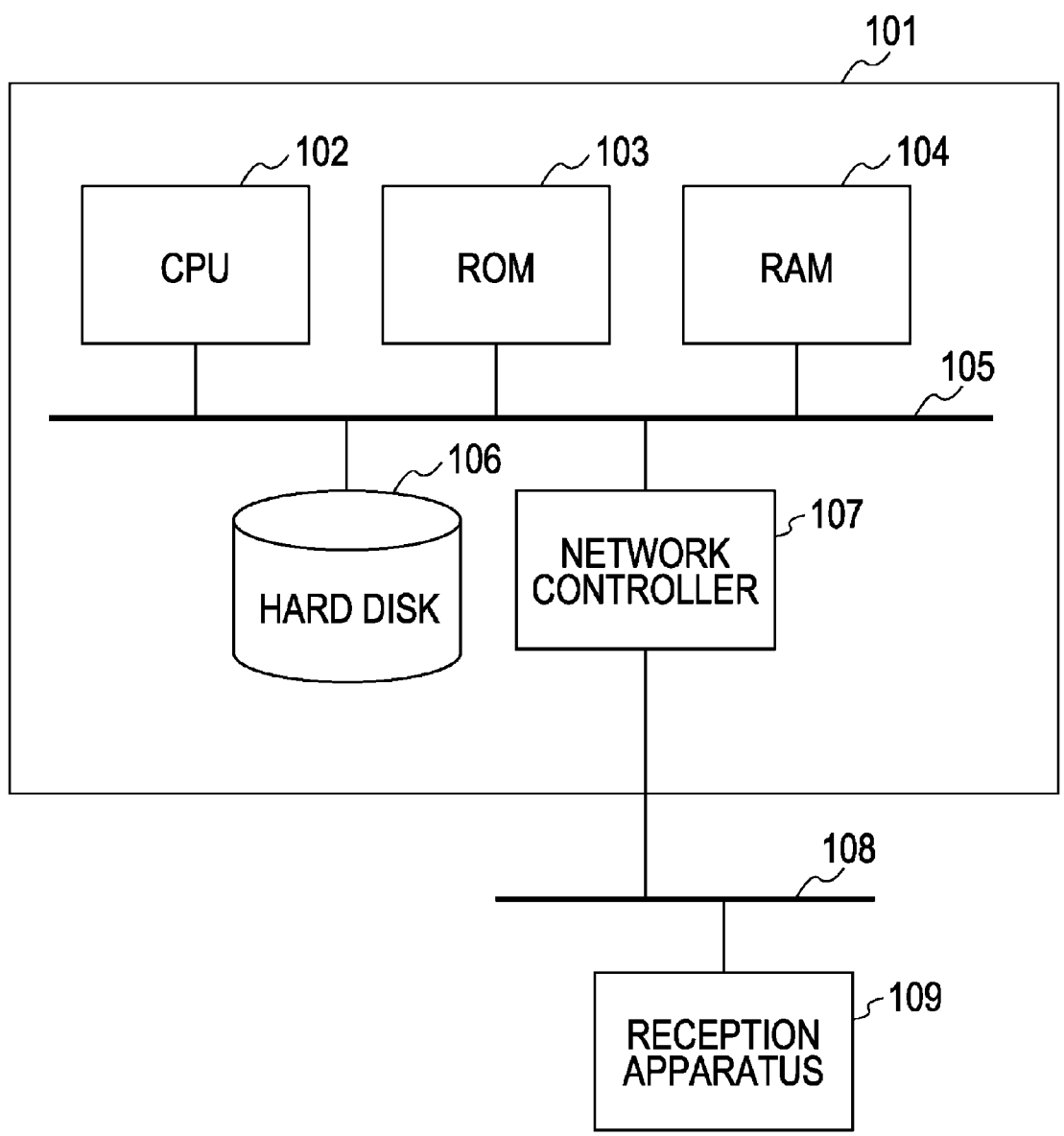
FIG. 1 is a configuration diagram of an information distribution apparatus.

Exemplary embodiments of the present invention will now be described in detail with reference to the attached drawings. It should be noted that the components described in these embodiments are to be understood to be exemplary only, and that the scope of the invention is not restricted to these components. In all of the drawings relating to the following drawings, components which are identical or equivalent are denoted with the same reference numerals.

FIG. 1 is an information distribution apparatus 101, i.e., a server according to a first embodiment of the present invention.

Reference numeral 102 denotes a CPU for controlling the overall information distribution apparatus 101, reference numeral 103 denotes a ROM for storing programs and parameters which do not need to be changed, and reference numeral 104 denotes RAM for temporarily storing data supplied from a hard disk 106, etc., and data generated during operation. Reference numeral 105 denotes a host bus for connecting a network controller 107. The hard disk 106 stores data such as stream contents, etc., and the network controller 107 is for connecting to a network line 108. Reference numeral 109 is a reception apparatus, i.e., client to which contents stored in the information distribution apparatus 101 are to be presented.

Now, processing will be described regarding taking an MPEG-2 transport stream (hereafter "MPEG-2TS") with multiple sets of video data and multiple sets of audio data multiplexed, and creating combinations of one set of video data and one set of audio data as virtual contents (combination information).

Figure 2:
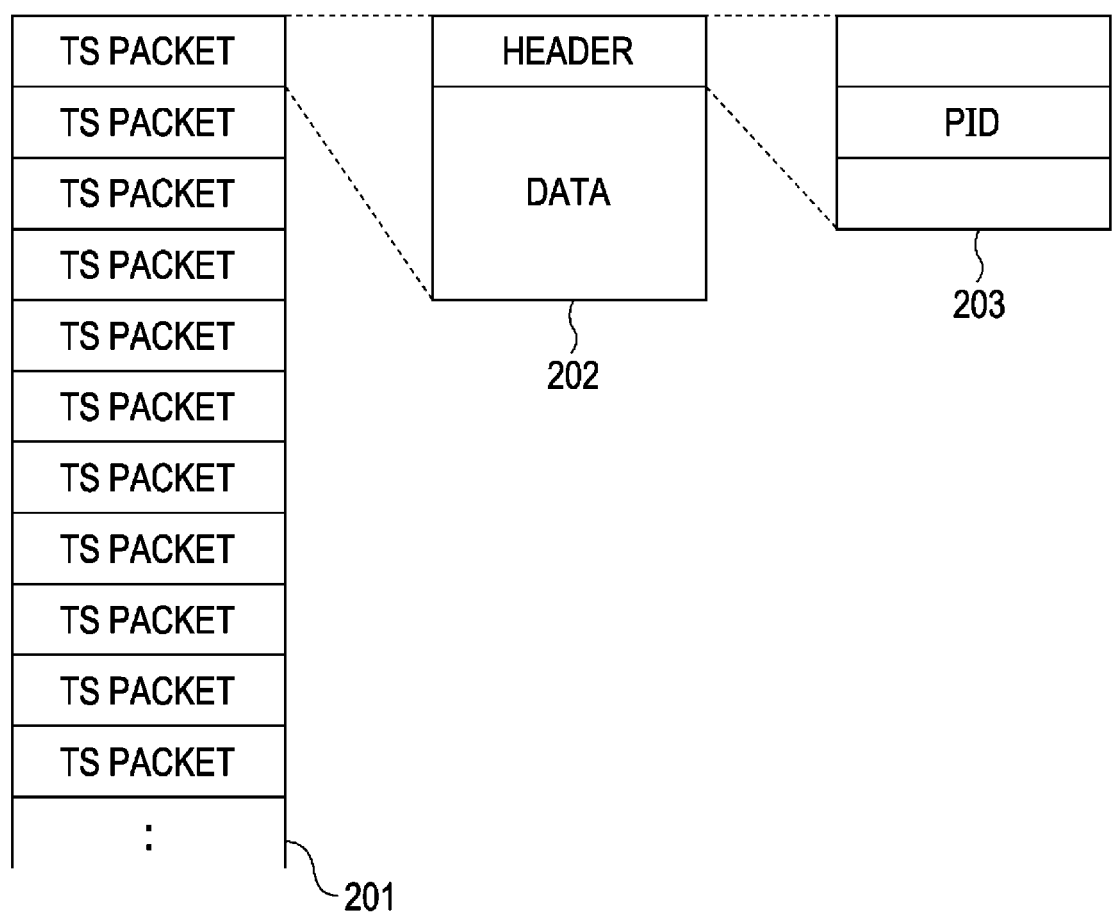
FIG. 2 is a diagram illustrating the configuration of an MPEG-2 transport stream.

First, the configuration of an MPEG-2TS will be described with reference to FIGS. 2 and 3. A MPEG-2TS is configured of multiple TS packets (201). Each TS packet is configured of a header portion and a data portion (202). Each header portion contains additional information 203, including a packet identifier (hereafter referred to as "PID"). The type of each TS packet is indicated by the PID.

Figures 3, 4:
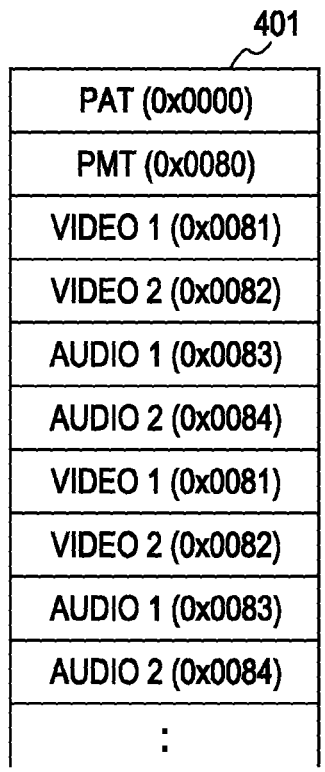
FIG. 3 is a diagram illustrating assigning of PID.
FIG. 4 is a diagram illustrating the configuration of an MPEG-2 transport stream.

ISO/IEC 13818-1 assigns the PID value types as shown in FIG. 3. FIG. 3 shows that TS packets with the PID value of 0x0000 have data of a type called "program association table (hereafter, 'PAT')" assigned to the data in 202. Also, program map tables (hereafter, "PMT") and elementary PIDs representing video data and audio data do not have fixed PID values. An indirect specification arrangement is used wherein PIDs of PMTs are defined in PAT data, and elementary PIDs are defined in PMT data, which will be described below.

An example of an MPEG-2TS with multiple sets of video data and multiple sets of audio data multiplexed is shown in FIG. 4. With the MPEG-2TS shown in FIG. 4, TS packets are arrayed in the order of PAT, PMT, video 1, video 2, audio 1, audio 2, video 1, video 2, audio 1, audio 2, etc. Note that the parentheses ( ) in FIG. 4 indicate the PID for each PS packet. FIG. 5A illustrates the PAT data of an MPEG-2TS having the configuration shown in FIG. 4, and FIG. 5B illustrates the PMT data thereof.

The PAT data stores a program_number, and a PID specifying a PMT corresponding to that program_number. The example in FIG. 5A shows that one program with a program_number of 1 is stored in the MPEG-2TS, and that the TS packet with the PID of 0x0080 is the PMT.

The PMT data stores stream_type representing the types of video data, audio data, etc. included in the MPEG-2TS, and PIDs for specifying the elementary streams corresponding to each stream_type. ISO/IEC 13818-1 assigns stream_types as shown in FIG. 6.

The example in FIG. 5B shows that the PID of the TS packet of which the stream_type is 0x02, i.e., MPEG-2 video, is 0x0081 and 0x0082, that the PID of the TS packet of which the stream_type is 0x04, i.e., MPEG-2 audio, is 0x0083, and further that the PID of the TS packet of which the stream_type is 0x0F, i.e., MPEG-2 AAC audio, is 0x0084.

A case wherein multiple elementary stream PIDs 0x01 or 0x02, which are stream_types representing video, are registered in a single PMT, means that video data is multiplexed. Also, a case wherein multiple elementary stream PIDs 0x03, 0x04, or 0x0F, which are stream_types representing audio, are registered in a single PMT, means that audio data is multiplexed. As shown in FIG. 5B, PID 0x02 is multiplexed.

While the structure of virtual contents is the same as that of MPEG-2TS, the difference is that with virtual contents, the data portion where video data or audio data is stored in an MPEG-2TS stores address information pointing to the video data or audio data.

Figure 7:
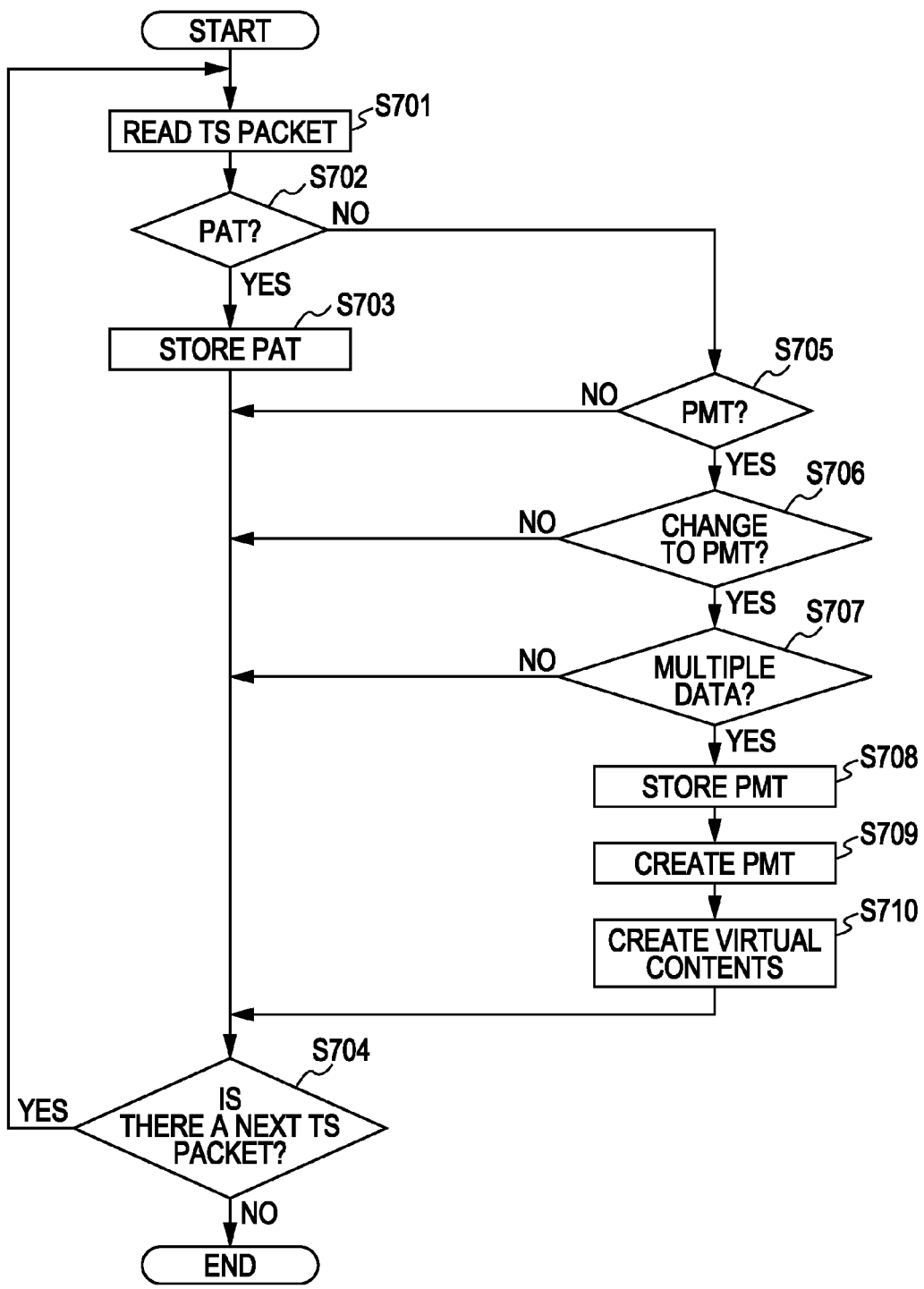
FIG. 7 is a flowchart illustrating the processing of creating virtual contents.

Now, the operation of creating combinations of one set of video data and one set of audio data, as virtual contents (combination information), from an MPEG-2TS having the configuration illustrated in FIGS. 4 through 5B, will be described with reference to the flowchart shown in FIG. 7. This operation is executed by the CPU 102 of the information distribution apparatus 101 following programs stored in the ROM 103 thereof.

In step S701, the CPU 102 reads out TS packet data from the MPEG-2TS stored in the hard disk 106. Next, in step S702, a determination is made whether the PID of the TS packet that was read out in step S701 indicates a PAT. In the event that the determination concludes that the value of the PID indicates a PAT, then in step S703 the PAT data is stored in the RAM 104. Next, if it is determined in step S704 that there is a next TS packet, the flow returns to step S701, otherwise, the processing ends.

In the event that the determination concludes that the value of the PID does not indicate a PAT, then in step S705, a determination is made whether the value of the PID indicates a PMT. The PID of the PMT included in the PAT data stored in step S703 is referred to for this determination regarding the PMT. In the event that no PAT data has been stored, this is not determined to be a PMT, and the flow proceeds to step S704.

If the value of the PID indicates a PMT in step S705, then in step S706 this value compared with the contents of the PMT data stored in the RAM 104. If no PMT data has been stored in the RAM 104 at this point, the subsequent processing is continued with the understanding that there has been a change, and processing for storing the PMT is performed in step S708 as described below. In the event that there has been a change to the PMT data in step S706, then in step S707, it is determined whether video data or audio data has been multiplexed with the MPEG-2TS which has been read. In the event that there has been no change to the PMT data in step S706, the flow proceeds to step S704.

In the case where the video data or audio data are found to be multiplexed in step S707, the PMT is stored in the RAM 104 in step S708. In the event there is found to be no multiplexing in step S707, the flow proceeds to step S704.

In step S709, a new PMT is created for each combination of one each of video data and audio data. The PMT creating processing performed in step S709 is described below.

In step S710, virtual contents (combination information) including each of the PMTs created in step S709 are created and stored in the hard disk 106.

Next, the multiplexing determination processing in step S707 will be described with reference to the flowchart in FIG. 8.

In step S801, a video counter indicating the number of sets of video data included in the program, and an audio counter indicating the number of sets of audio data, are both initialized to 0. Then, in step S802, the PMT data is read.

Next, in step S803, the stream_type in PMT data is determined. If the determination concludes that the stream_type is 0x01 or 0x02 which represent video data, the video counter is incremented by 1 in step S804. In the event that the stream_type is not video data in step S803, in step S805 a determination is made whether the stream_type is 0x02, 2x04, or 0x0F, which represent audio data. If the determination concludes that the stream_type is audio data, the audio counter is incremented by 1 in step S806. If the determination in step S805 concludes that the stream_type is not audio data, the flow proceeds to step S807, where the flow returns to step S803 in the event that there is more PMT data. If there is not more PMT data, the processing ends.

As described above, determination processing is performed regarding all data within the PMT, and in the event that the video counter is two or higher, determination is made that video data is multiplexed. Also, in the event that the audio counter is two or higher, determination is made that audio data is multiplexed. In the case indicated by reference numeral 401 in FIG. 4, two is set to the video counter and two is set to the audio counter.

Figure 9:
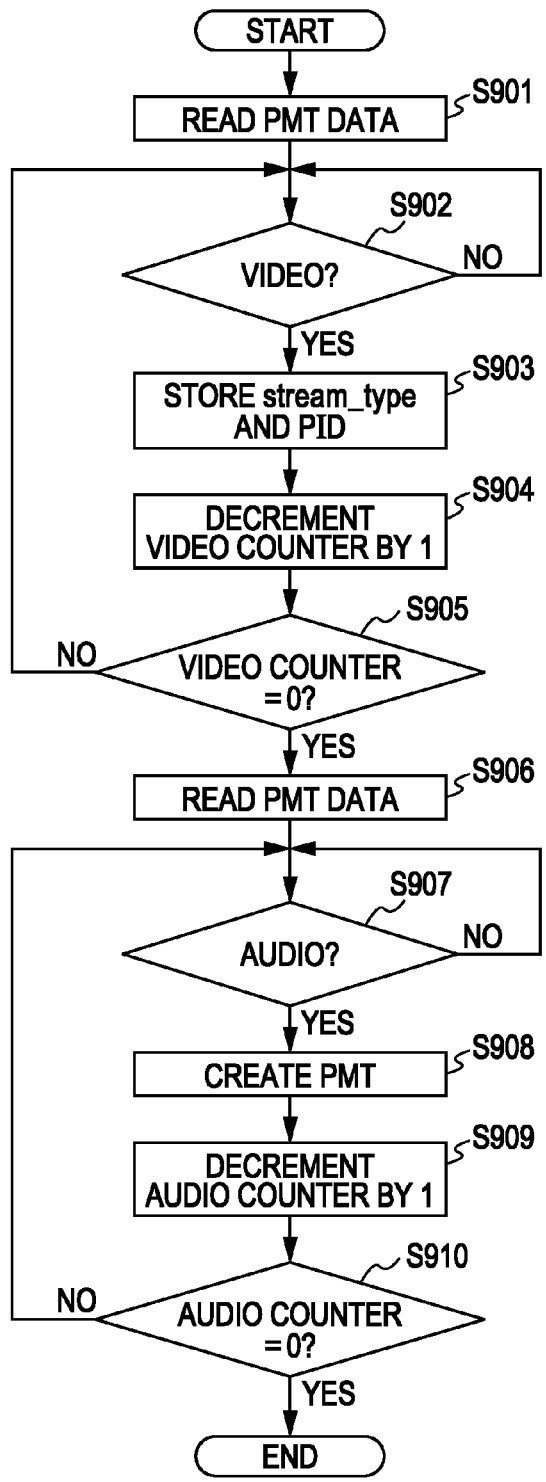
FIG. 9 is a flowchart illustrating the processing of creating a PMT.

Next, the PMT creating processing in step S709 will be described with reference to the flowchart in FIG. 9.

In step S901, PMT data is read. Next, in step S902, a stream_type in the PMT data is determined. In the event that the determination concludes that the stream_type is 0x01 or 0x02 which represent video data, then in step S903, the PID corresponding to the stream_type is stored. In the event that the determination concludes that the stream_type is not video data, the flow returns to conduct a determination of the next stream_type in the PMT.

Figure 8:
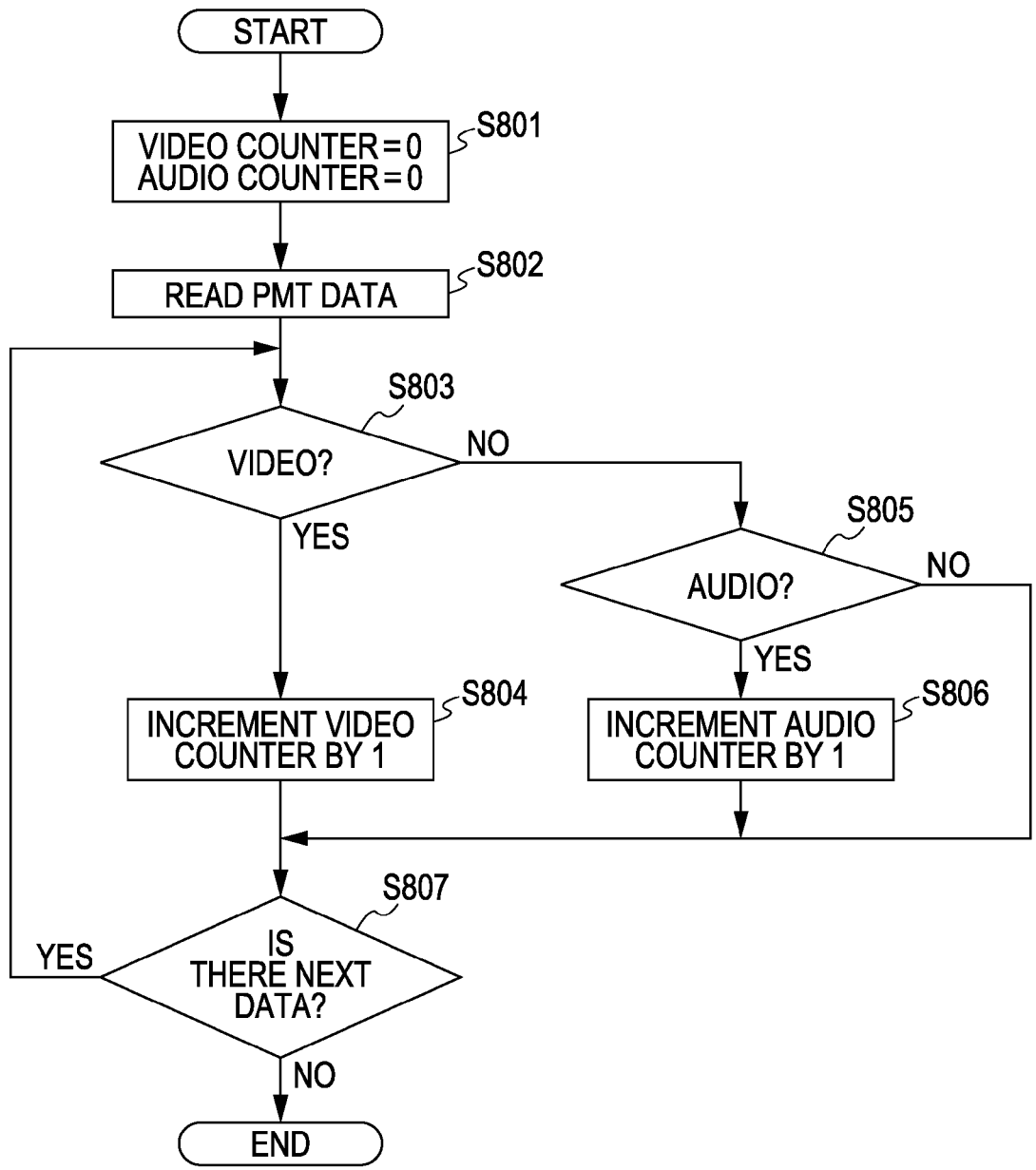
FIG. 8 is a flowchart illustrating data multiplexing determination processing.

In step S904, the value of the video counter set in the processing in FIG. 8 is decremented by 1. Next, the flow proceeds to step S905, where in the event that the value of the video counter is not zero, the flow returns to step S902, where the next stream_type in the PMT data is determined. In the case of the PMT data shown in FIG. 5B, "stream_type=0x02, PID=0x0081" and "stream_type=0x02, PID=0x0082" which indicate video data are stored as a result of the processing in step S903. In the event that the value of the video counter is zero in step S905, the flow proceeds to step S906.

In step S906, the PMT data is read again. In step S907, a determination is made whether the stream_type in the PMT data is associated with audio data. In the event that the determination concludes that the stream_type is 0x03, 0x04, or 0x0F, which represent audio data, the flow proceeds to step S908. In the event that determination concludes that the stream_type is not audio data, the next stream_type in the PMT data is checked.

In step S908, a new PMT is created in which the stream_type and PID determined in step S907 are added for each set of stream_type and PID stored in step S903. For example, a description will be made here regarding the case of having stored "stream_type=0x02, PID=0x0081" and "stream_type=0x02, PID=0x0082" in step S903. In the event that "stream_type=0x04, PID=0x0083" which indicates audio data is obtained as a result of the determination performed in step S907, a combination of one each of video data and audio data is created. That is, a combination is created of "stream_type=0x02, PID=0x0081" and "stream_type=0x04, PID=0x0083". Further, a combination is created of "stream_type=0x02, PID=0x0082" and "stream_type=0x04, PID=0x0083". Examples of these PMTs created are indicated by reference numerals 1001 and 1002 in FIG. 10.

In step S909, the value of the audio counter set in the processing in FIG. 8 is decremented by one. Next, the flow proceeds to step S910, where in the event that the value of the audio counter is not zero, the flow returns to step S907, where the next stream_type in the PMT data is determined. In the event that the value of the audio counter is zero in step S910, the processing ends.

As a result of the above-described processing, the PMT data in FIG. 5B is configured of two sets of video data and two sets of audio data. Thus, in addition to 1001 and 1002, PMTs 1003 and 1004 are created.

Figure 11:
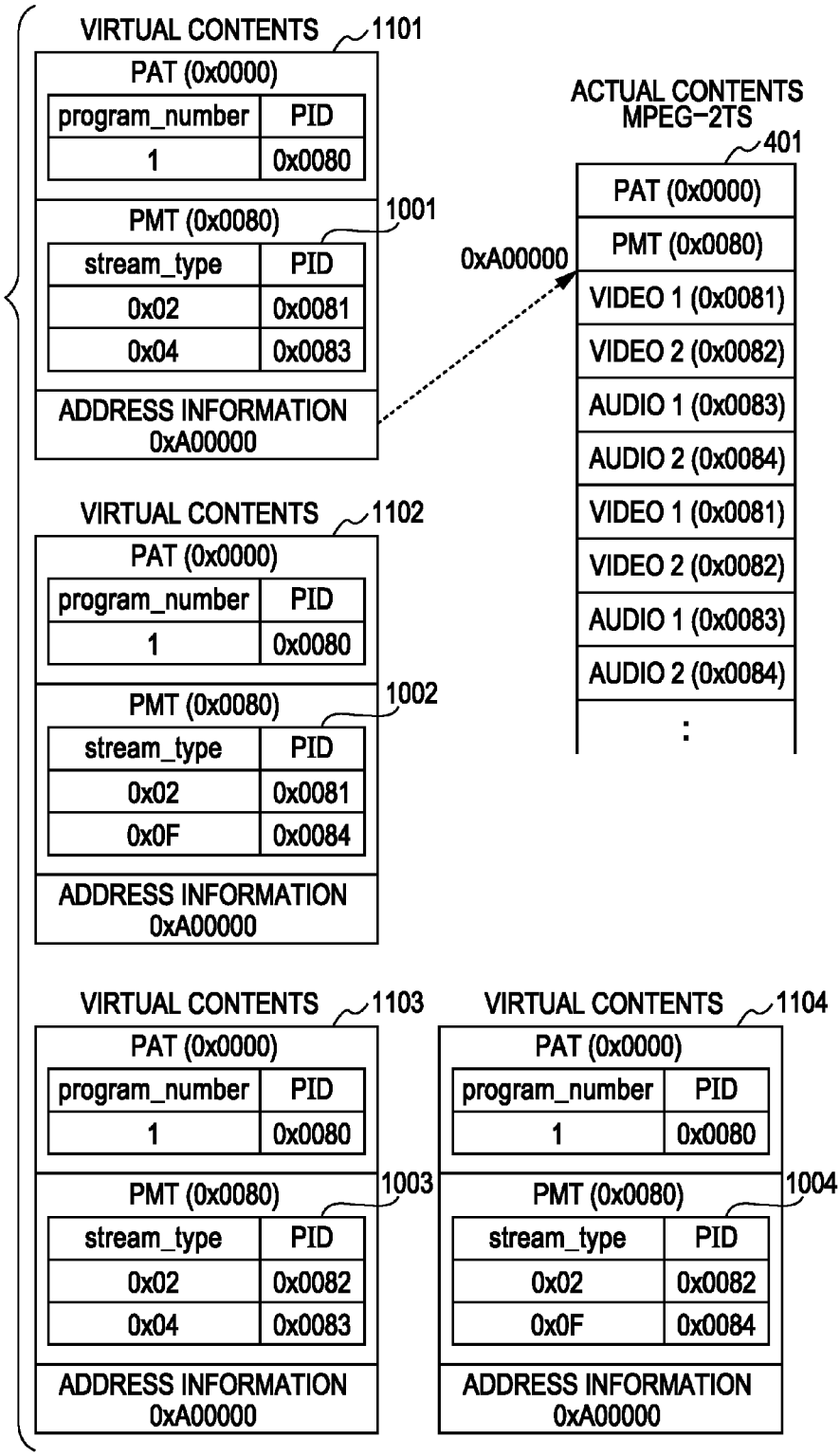
FIG. 11 is a diagram illustrating the configuration of virtual contents.

FIG. 11 illustrates the configuration of virtual contents (combination information) created in the above-described manner. Virtual contents 1101 is configured of the PAT stored in step S703, the PMT data 1001 created in step S709, and address information of the MPEG-2TS video data and audio data. Note that the address information indicates the start address (0xA00000) of the MPEG-2TS video data and audio data which are the actual contents. This holds true for the PMTs 1102, 1103, and 1104 as well, with virtual contents being created respectively including the PMT data 1002 through 1104 created in step S709. Thus, an MPEG-2TS is scanned, and four virtual contents can be created for each combination of one each of video data and audio data.

Figure 12:
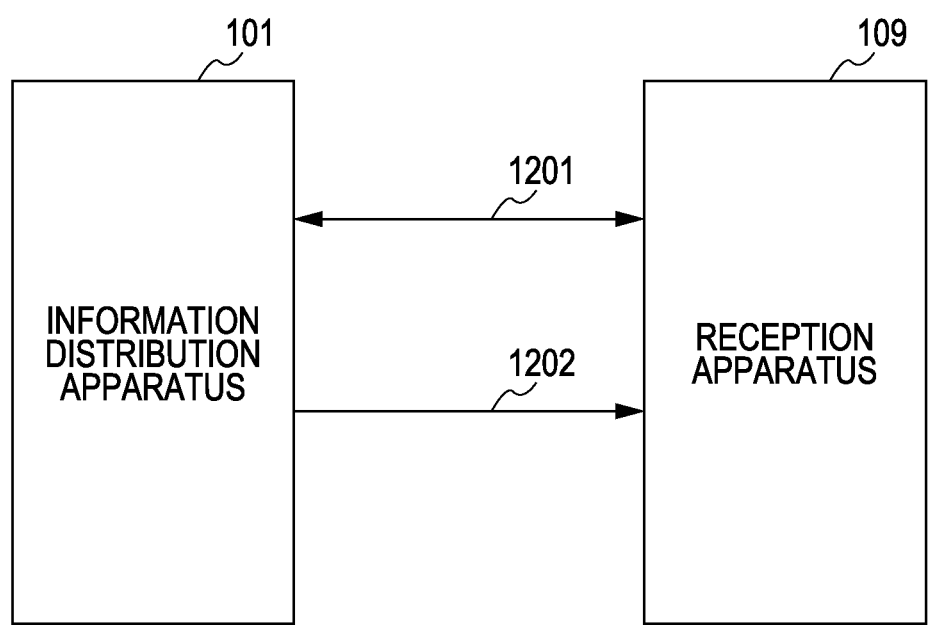
FIG. 12 is a diagram illustrating procedures for presenting contents over a network.

Next, operations of presenting the created virtual contents to a reception apparatus over a network will be described. FIG. 12 is a diagram illustrating the procedures for presenting contents over a network according to the present embodiment. Standard protocol conformant to the DLNA guideline is executed between the information distribution apparatus 101 and reception apparatus 109. With the present embodiment, contents can be presented without adding any unique protocol to this standard protocol.

In a procedure 1201, a protocol is executed for the reception apparatus 109 to discover an information distribution apparatus 101 on the network 108. This is executed by SSDP (Simple Service Discovery Protocol), which is a part of the UPnP specifications.

In a procedure 1202, a protocol is executed for presenting contents stored in the hard disk 106 of the information distribution apparatus 101 to the reception apparatus 109. This is executed by Content Directory Service (hereafter "CDS") which is a part of UPnP AV specifications (an interconnection specification for audio and video equipment based on the UPnP specifications). Procedure 1202 is described below.

Figure 13:
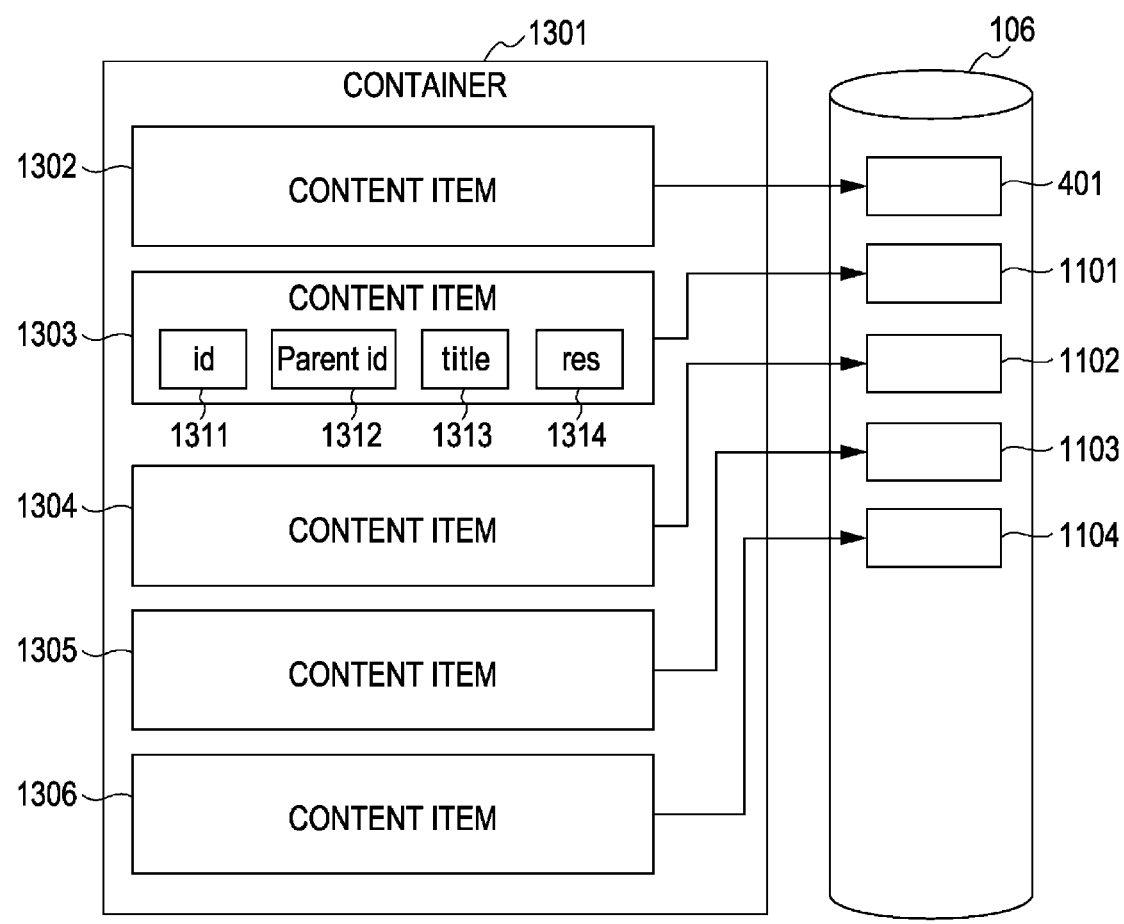
FIG. 13 is a diagram illustrating content management information stored in a hard disk.

FIG. 13 is a diagram illustrating content management information stored in the hard disk 106 of the information distribution apparatus 101. As mentioned above, the contents stored in the hard disk 106 are managed as a content directory by the CDS of UPnP AV.

A content 1301 is an object including multiple content items. A content item 1302 is a content item which can be searched or browsed from the reception apparatus 109. Also, the content item 1302 is an item for presenting MPEG-2TS contents stored in the hard disk 106 to the reception apparatus 109. In the same way, content items 1303 through 1306 are content items which can be searched or browsed from the reception apparatus 109, and are items for presenting MPEG-2TS contents stored in the hard disk 106 to the reception apparatus 109.

Each content item has multiple properties 1311 through 1314. An "id" 1311 is content identification information in the content directory, and a "Parent id" 1312 is identification information of a parent object. A content title is set in a "title" 1313, and protocol information by which to access contents and a URI specifying contents are set in a "res" 1314.

Figure 14:
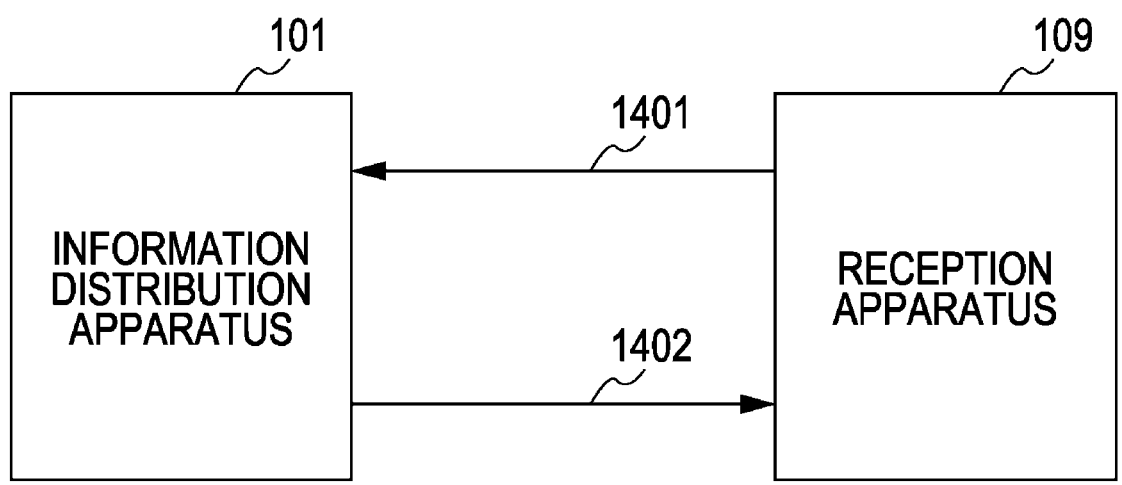
FIG. 14 is a diagram illustrating procedures for presenting contents to a reception apparatus.

FIG. 14 is a diagram illustrating the details of the procedure 1202 for presenting contents to the reception apparatus 109. In a procedure 1401, the reception apparatus 109 issues a search command (command for searching) or a browse command (command for browsing) based on CDS to the information distribution apparatus. The search command requests a content list matching the specified search conditions, and the browse command requests a content list included in certain contents.

In a procedure 1402, the information distribution apparatus 101 returns the content list shown in FIG. 15 as a response to the search command or browse command from the reception apparatus 109. Set in the content list are properties of searched or browsed content items matching the conditions of the search command or browse command (title, res, etc. in FIG. 13).

In the example shown in FIG. 15, five sets of content item information, 1501 through 1505, are set in a content list 1500. The content item information 1501 has an id of 100 and a title of AAAA. The content item information 1502 has an id of 101 and a title of BBBB. The content item information 1503 has an id of 102 and a title of CCCC. The content item information 1504 has an id of 104 and a title of DDDD. The content item information 1505 has an id of 104 and a title of EEEE. An operator of the reception apparatus 109 can know what the contents are by such information.

Note that the content of the content item information 1501 is a MPEG-2TS content 401, and the contents of the content item information 1502 through 1505 are virtual contents 1101 through 1104.

Thus, according to the present embodiment, content item information of virtual contents is set in the content list 1500 and returned to the reception apparatus, and can be presented in the same way as with MPEG-2TS contents. Accordingly, reception apparatus within a network conformant to a predetermined standard guideline can be presented with combinations of one each of video data and audio data making up a stream as virtual contents.

It should be noted that while an example has been described in the present embodiment regarding a case of being configured of multiple sets of video data and multiple sets of audio data, the present invention is not restricted to this example, and can be carried out in cases wherein the video data and audio data are not multiple.

In the first embodiment, virtual contents (combination information) created at an information distribution apparatus 101 are presented to a reception apparatus 109. In a second exemplary embodiment, operations for extracting video data and audio data from MPEG-2TS contents and transmitting to the reception apparatus as a single stream, based on a transmission request for virtual contents from the reception apparatus, will be described. The method for presenting the virtual contents created at the information distribution apparatus 101 to the reception apparatus is the same as with the first embodiment, and accordingly description thereof will be omitted herein.

Figure 16:
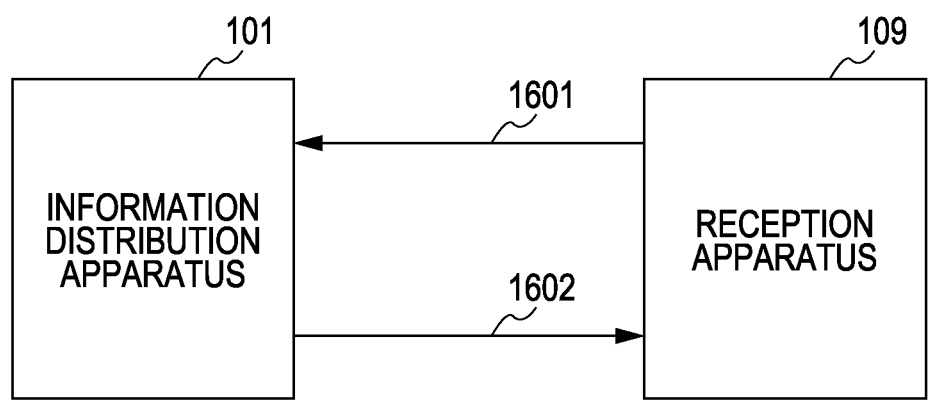
FIG. 16 is a diagram illustrating procedures for sending a stream.

FIG. 16 is a diagram illustrating the procedures for sending a stream in response to a content transmission request from the reception apparatus 109.

In procedure 1601, the reception apparatus 109 issues to the information distribution apparatus 101 an "http-get" command specifying the URI of a desired content item, based on the content list 1500. In procedure 1602, the information distribution apparatus transmits a stream based on the content item specified by the URI as a response to the "http-get" command from the reception apparatus 109.

Figure 17:
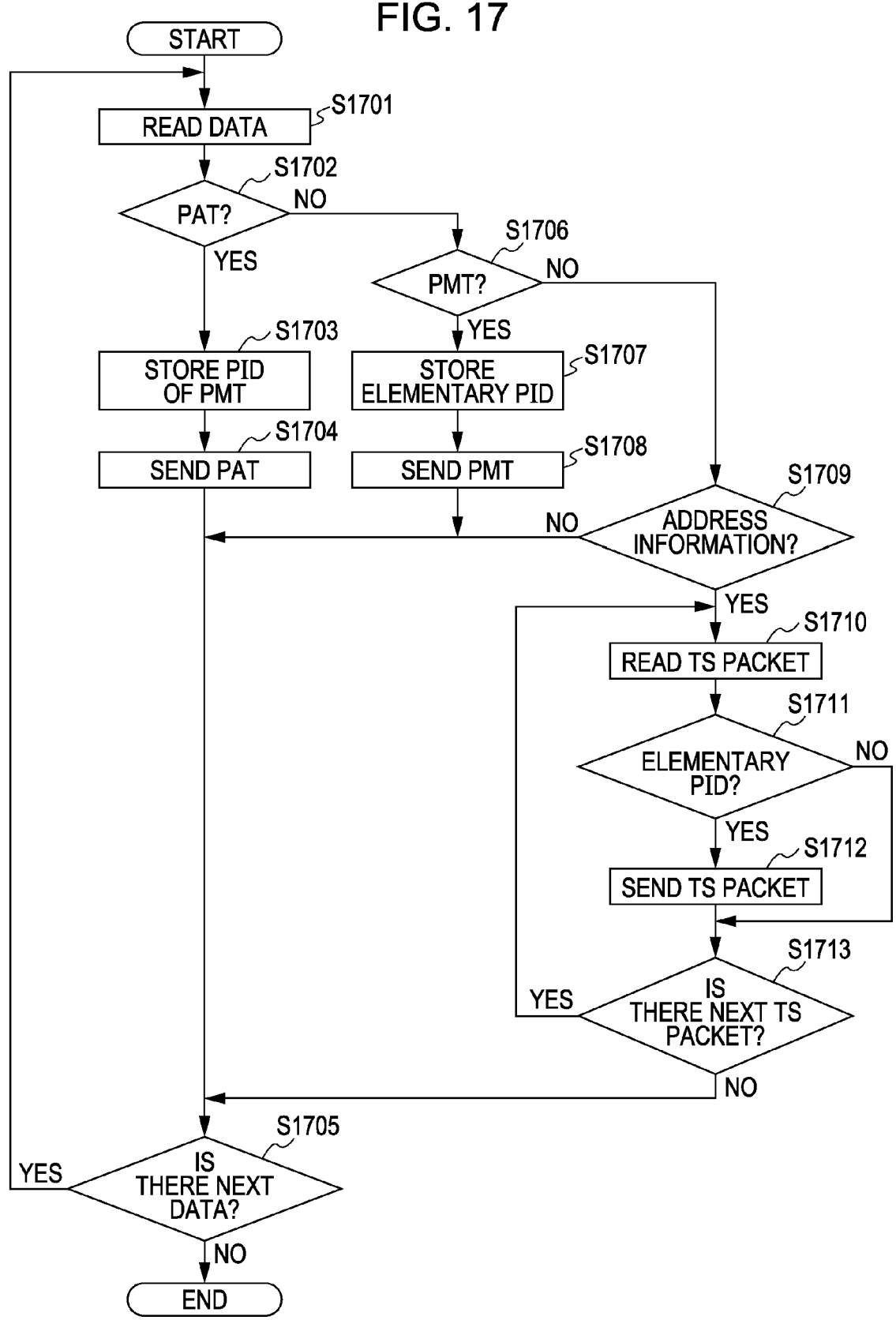
FIG. 17 is a flowchart illustrating processing for creating virtual contents.

Stream transmission processing performed at the information distribution apparatus 101 at the time of playing virtual contents will be described with reference to the flowchart in FIG. 17.

In step S1701, data is read out from the virtual contents. In step S1702, a determination is made whether the read out data is PAT. If it is, then, the flow proceeds to step S1703, where the PID of the PMT stored in the PAT data is stored in the RAM 104. Next, in step S1704, the PAT read out from the contents is sent to the reception apparatus 109. In step S1705, a check is made whether there is subsequent data. In the event that there is subsequent data, the flow returns to step S1701, otherwise, the processing ends.

In the event that the read out data is not a PAT, the flow proceeds to step S1706, where a determination is made whether there is PMT data, and if there is, the elementary PID stored in the PMT data is stored in the RAM 104 in step S1707. The flow then proceeds to step S1708, where the PMT read out from the contents is sent to the reception apparatus 109.

In the event that the data read out in step S1706 is not a PMT, the flow proceeds to step S1709 where a determination is made whether this is address information. If it is address information, the flow proceeds to step S1710, where a TS packet is read out from the MPEG-2TS content which the address indicates. The flow then proceeds to step S1711, where it is determined whether the PID of the TS packet that has been read matches the elementary PID stored in step S1707. If there is a match, the flow proceeds to step S1712, and the TS packet is sent to the reception apparatus 109.

Next, in step S1713, a determination is made whether there is subsequent data in the MPEG-2TS content. If there is subsequent data, the flow returns to step S1710, and if not, the flow proceeds to step S1705.

According to the present embodiment, in the event of playing virtual contents 1101 through 1104, the PAT and PMT in the virtual contents are first read out and sent to the reception apparatus 109. Next, only the TS packets having elementary PIDs registered in the PMT of the virtual contents are taken from the MPEG-2TS contents and sent to the reception apparatus 109.

Thus, according to the present embodiment, a combination of one each of video data and audio data making up a stream can be sent to a reception apparatus within a network conformant to a predetermined standard guideline as a single stream.

With the above first and second embodiments, description has been made regarding a case wherein, in the event of an MPEG-2TS, a determination is made whether the stream is multiplexed based on the PMT data, virtual contents (combination information) are created for each combination of one each of video data and audio data, and sent.

In a third exemplary embodiment of the present invention, a description will be made regarding a case wherein an MPEG stream is broken down into Packetized Elementary Stream (hereafter, "PES") units, virtual contents are created for each combination of one each of video data and audio data, and sent. Breaking down into PES units is also applicable to systems other than MPEG-2TS, as well as to MPEG-2TS.

Figure 18:
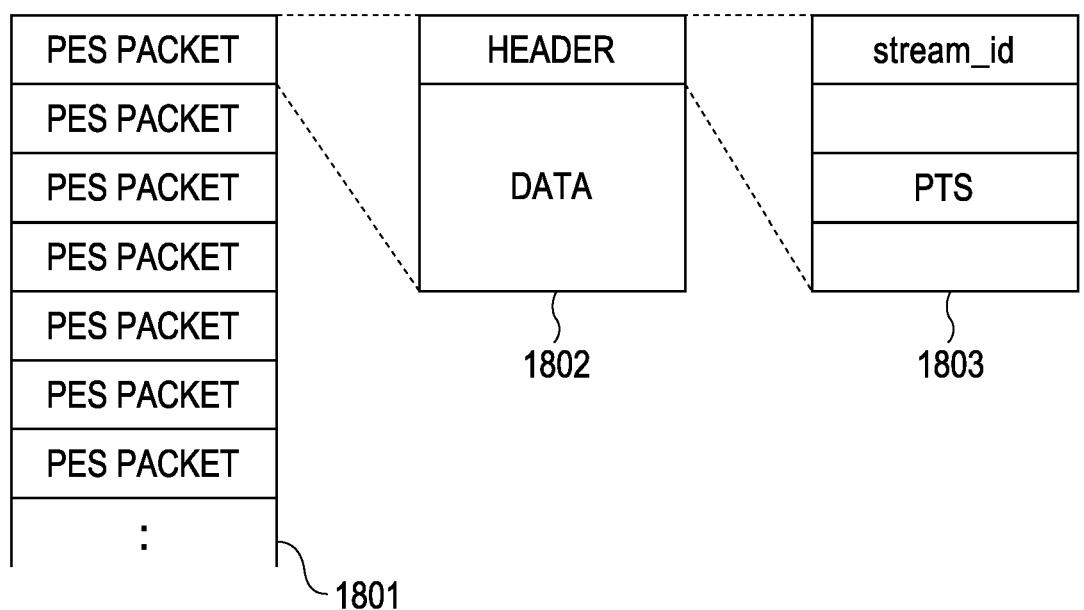
FIG. 18 is a diagram illustrating the configuration of an MPEG stream.

FIG. 18 illustrates a structure wherein a single MPEG stream 1801 has been broken down into PES packets. A PES packet is configured of a header portion and data portion (1802). The header portion includes a stream_id and presentation time stamp (hereafter, "PTS") (1803). The stream_id is an identifier for indicating the type of PES packet in which the stream_id is included, with assigning of stream_id being stipulated by ISO/IEC 13818-1, as shown in FIG. 19.

Figures 19, 20:
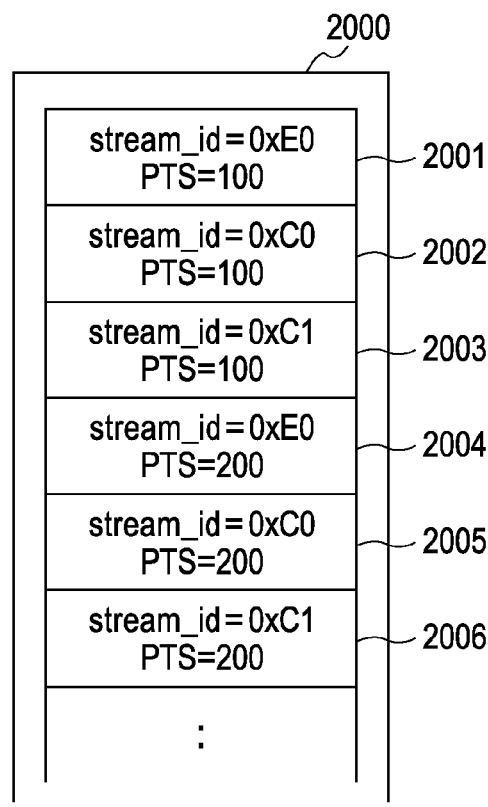
FIG. 19 is a diagram illustrating assigning of stream_id.
FIG. 20 is a diagram illustrating a configuration example of an MPEG stream.

In FIG. 19, "x" means that this digit can assume a value of either 0 or 1. Accordingly, "110x xxxx" means in binary that a range of "1100 0000" to "1101 1111" can be assumed. Thus, the PES packets in FIG. 19 can range from "1100 0000" to "1101 1111" for the stream_id include MPEG audio data. In the same way, "1110 xxxx" means in binary that a range of "1110 0000" to "1110 1111" can be assumed. This shows here that PES packets having a range of "1110 0000" to "1110 1111" for the stream_id include MPEG video data.

PTS is time information indicating the presentation point-in-time of the PAS packet in which the PTS is included. The PTS is set at the time of creating the MPEG stream such that video and audio can be played consecutively when playing the MPEG stream by presenting the data of the PES packet at the point-in-time specified by the PTS.

FIG. 20 shows an example of an MPEG stream where one set of video data and two sets of audio data are multiplexed. The MPEG stream 2000 is configured of PES packets 2001 through 2006. The stream_id of the PES packet 2001 is 0xE0 and the PTS is 100, the stream_id of the PES packet 2002 is 0xC0 and the PTS is 100, etc. for PES packets 2003 through 2006.

The stream_id=0xE0 of the PES packet 2001 is 11100000 in binary, and making reference to FIG. 19, shows that the PES packet 2001 is MPEG video. In the same way, the stream_id=0xC0 of the PES packet 2002 indicates MPEG audio, and the stream_id=0xC1 of the PES packet 2003 also indicates MPEG audio. The same is true for PES packets 2004 through 2006.

The PTSs of the PES packets 2001 through 2003 are 100, with the MPEG stream having been configured to present these three PES packets at the same point-in-time. The PES packets 2002 and 2003 are both MPEG audio and have the same PTS set, meaning that these have been multiplexed such that one is to be selected at the time of playing.

The PTSs of the PES packets 2004 through 2006 are 200. The MPEG stream has been configured to present these three PES packets at the same point-in-time. The PES packets 2005 and 2006 are both MPEG audio and have the same PTS set, meaning that these have been multiplexed such that one is to be selected at the time of playing.

Figure 21:
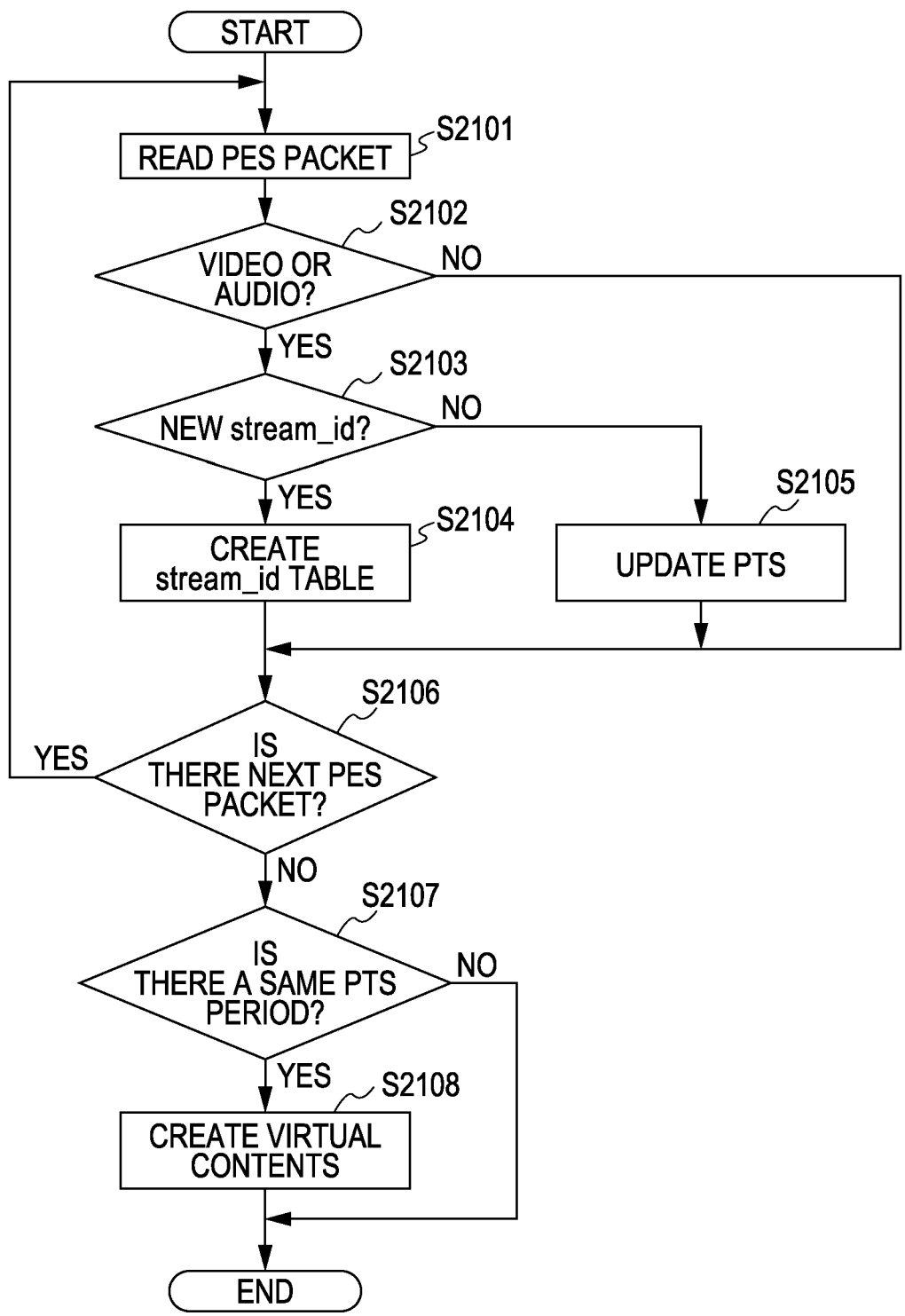
FIG. 21 is a flowchart illustrating processing for creating virtual contents.

Processing for creating combinations of one each of video data and audio data as virtual contents from the MPEG stream 200 will be described with reference to the flowchart in FIG. 21.

In step S2101, a PES packet is read from the MPEG stream 2000. In step S2102, stream_id determination is performed, and in the event that the stream_id is an id indicating video data or audio data, the flow proceeds to step S2103. In step S2103, a determination is made whether the stream_id of the PES packet that has been read has newly appeared in the stream. In the event that this stream_id is a new stream_id, then in step S2104 a stream_id table is created in the RAM 104. In the event that a determination is made in step S2103 that the stream_id is not a new stream_id, the flow proceeds to step S2105 where the PTS of the corresponding stream_id table is updated.

In step S2106, a check is made whether there is a subsequent PES packet. In the event that there is a subsequent PES packet in the stream, the flow returns to step S2101, otherwise, the flow proceeds to step S2107.

In step S2107, stream_id tables 2201 and 2202, described below with respect to FIG. 22, created in steps S2104 and S2105 are scanned, and a determination is made whether multiple stream_ids with the same PTS period exist. In the event that there are multiple stream_ids with the same PTS period in either one of the stream_id tables 2201 or 2202, the flow proceeds to step S2108, and in the event that there is none in either, the processing ends.

In step S2108, virtual contents configured of the combination of one each of video data and audio data is created based on the stream_id table created in steps S2104 and S2105.

Figure 22:
FIG. 22 is a diagram illustrating the configuration of a stream_id table.

FIG. 22 shows the configuration of a stream_id table. A stream_id table stores the stream_id, start PTS, and end PTS of a PES packet. For the stream_id table, a video table 2201 and audio table 2202 are created. A detailed method for creating the stream_id tables 2201 and 2202 will now be described.

First, the stream_id=0xE0 of the PES packet 2001 is a stream_id which has newly appeared in the MPEG stream 2000, and accordingly is determined to be a new stream_id (step S2103). Accordingly, a stream_id table with stream_id=0xE0, start PTS=100, and end PTS=100 is created (step S2104).

Next, the stream_id=0xC0 of the PES packet 2001 is a stream_id which has newly appeared in the MPEG stream 2000, and accordingly is determined to be a new stream_id (step S2103). Accordingly, a stream_id table with stream_id=0xC0, start PTS=100, and end PTS=100 is created (step S2104). In the same way, a stream_id table with stream_id=0xC1, start PTS=100, and end PTS=100 is created for the PES packet 2003 as well (step S2104).

Further, the stream_id=0xE0 of the PES packet 2004 is a stream_id which has already appeared in the MPEG stream 2000, and accordingly is determined to be an already-existing stream_id (step S2103). Accordingly, the end PTS of the stream_id table of the stream_id=0xE0 is updated such that the PTS=200 for the PES packet 2004 (step S2105). In the same way, with the PES packet 2005, the end PTS of the stream_id table of the stream_id=0xC0 is updated such that the PTS=200 (step S2105), and with the PES packet 2006, the end PTS of the stream_id table of the stream_id=0xC1 is updated such that the PTS=200 (step S2105). Thus, stream_id tables 2201 and 2202 are created.

Figure 24:
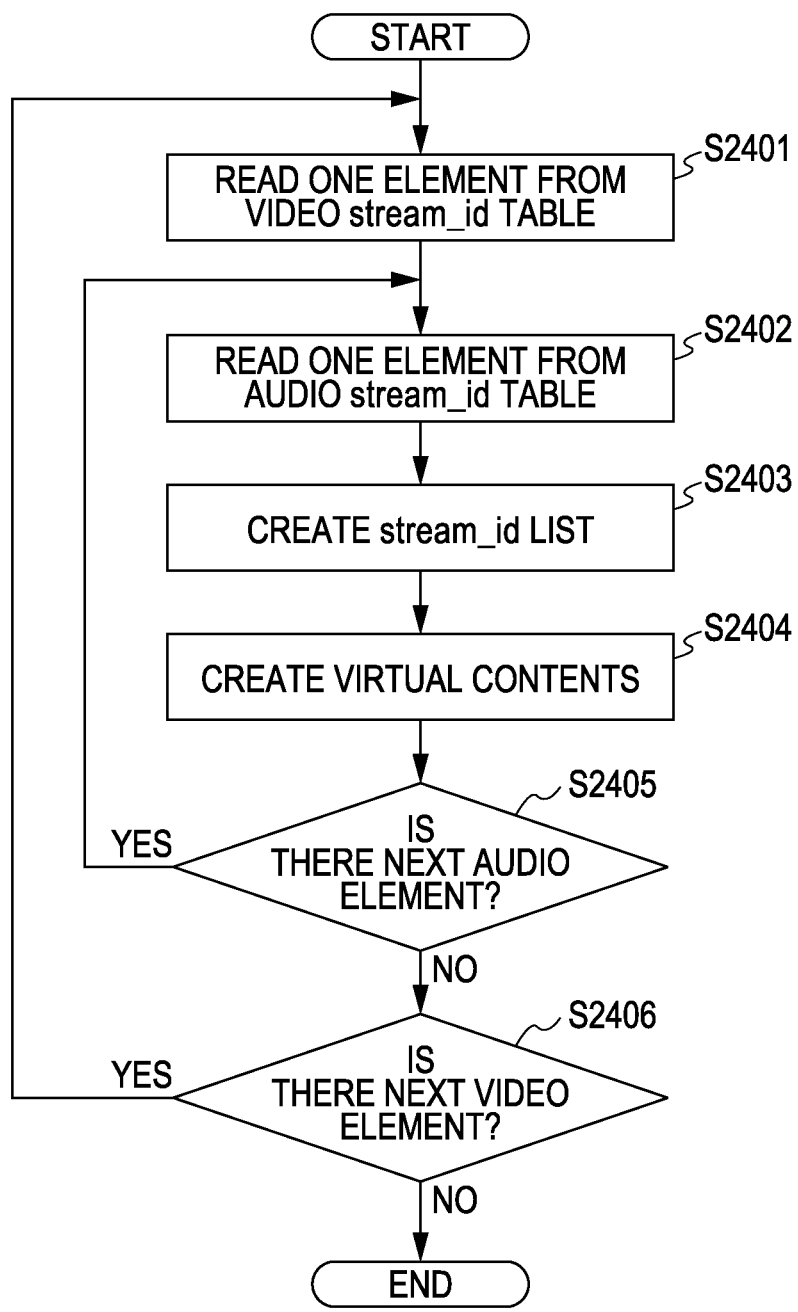
FIG. 24 is a flowchart illustrating processing for creating virtual contents.

Next, the processing for creating virtual contents in step S2108 will be described in detail with reference to the flowchart in FIG. 24.

In step S2401, one stream_id is read out from the stream_id table 2201. Next, in step S2402, one stream_id is read out from the stream_id table 2202. In step S2403, a stream_id list configured of the stream_id read out in step S2401 and the stream_id read out in step S2402 is created. Thus, one stream_id list is created.

Further, in step S2404, virtual contents configured of the stream_id list created in step S2403 and address information indicating an MPEG stream which is actual contents is created. Thus, one virtual content is created.

The flow then proceeds to step S2405, where it is determined whether there is a subsequent element in the audio stream_id table 2202. In the event that there is a subsequent element in the audio stream_id table 2202, the flow returns to step S2402, and the processing of steps S2402 through S2404 is repeated for the next audio element. In the event that there is no subsequent element in the audio stream_id table 2202, the flow proceeds to step S2406.

In step S2406, a check is made whether there is a subsequent element in the video stream_id table 2201. In the event that there is a subsequent element in the video stream_id table 2201, the flow returns to step S2401, and the processing of steps S2401 through S2405 is repeated for the next video element. In the event that there is no subsequent element in the video stream_id table 2201, the processing ends.

Per the above-described processing, PES packets in an MPEG stream can be scanned, and combinations of one each of video data and audio data making up the stream can be each created as virtual contents based on stream_id and PTS.

Figure 23:
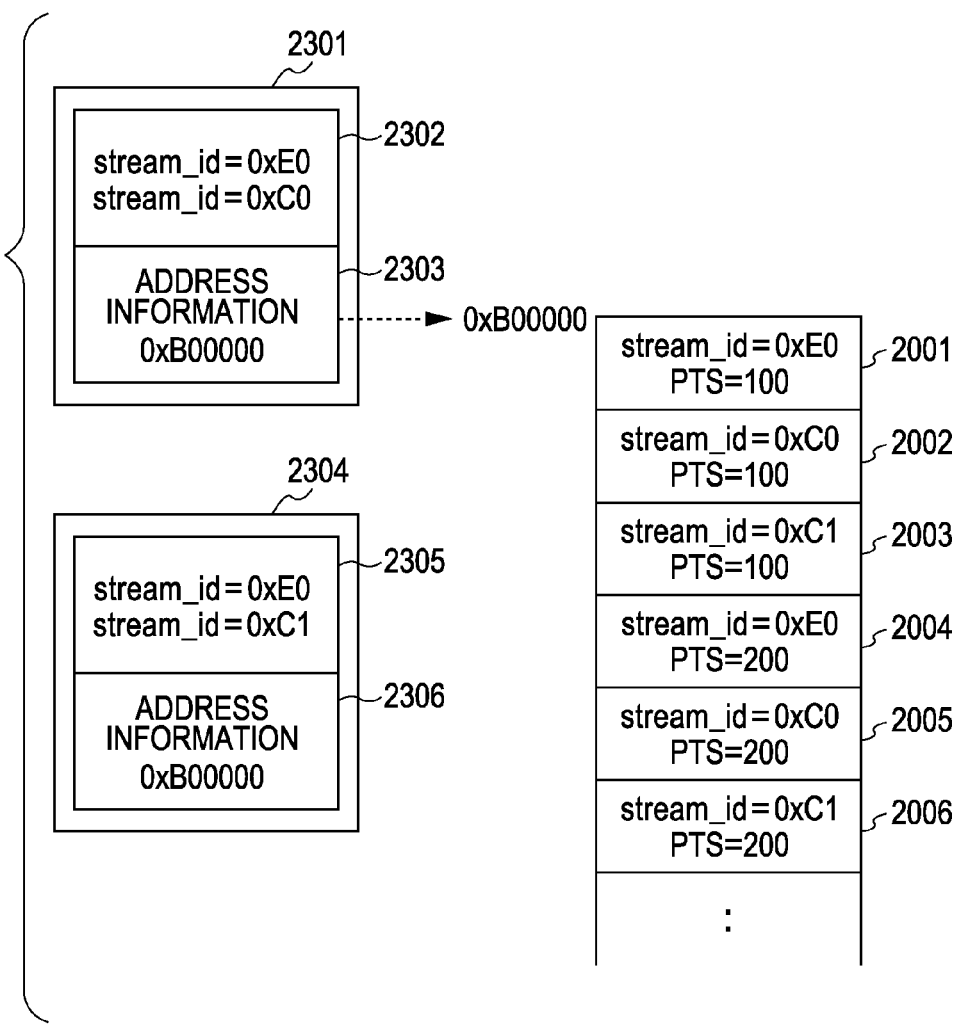
FIG. 23 is a diagram illustrating the configuration of virtual contents.

FIG. 23 illustrates an example of virtual contents created as described above. A virtual content 2301 is configured of a stream_id list 2302 and address information 2303. The stream_id list 2302 is created based on stream_id tables 2201 and 2202. The address information 2303 represents the start address (0xB00000) of the video data and audio data in the MPEG stream 2000 which is the actual contents.

In the same way, a virtual content 2304 is configured of a stream_id list 2305 and address information 2306. The stream_id list 2305 is created based on stream_id tables 2201 and 2202. The address information 2306 represents the start address (0xB00000) of the video data and audio data in the MPEG stream 2000 which is the actual contents.

The method for presenting the created virtual contents is the same as in the first embodiment, thus, a detailed description is omitted herein.

Next, the operation for extracting the video data and audio data from the MPEG stream which has been subjected to PES division and sending to the reception apparatus as a single stream, based on the virtual content transmission request from the reception apparatus, will be described. The procedures for sending a stream in response to a content transmission request from the reception apparatus 109 is the same as previously described with reference to FIG. 16, and accordingly a description thereof is omitted herein.

Figure 25:
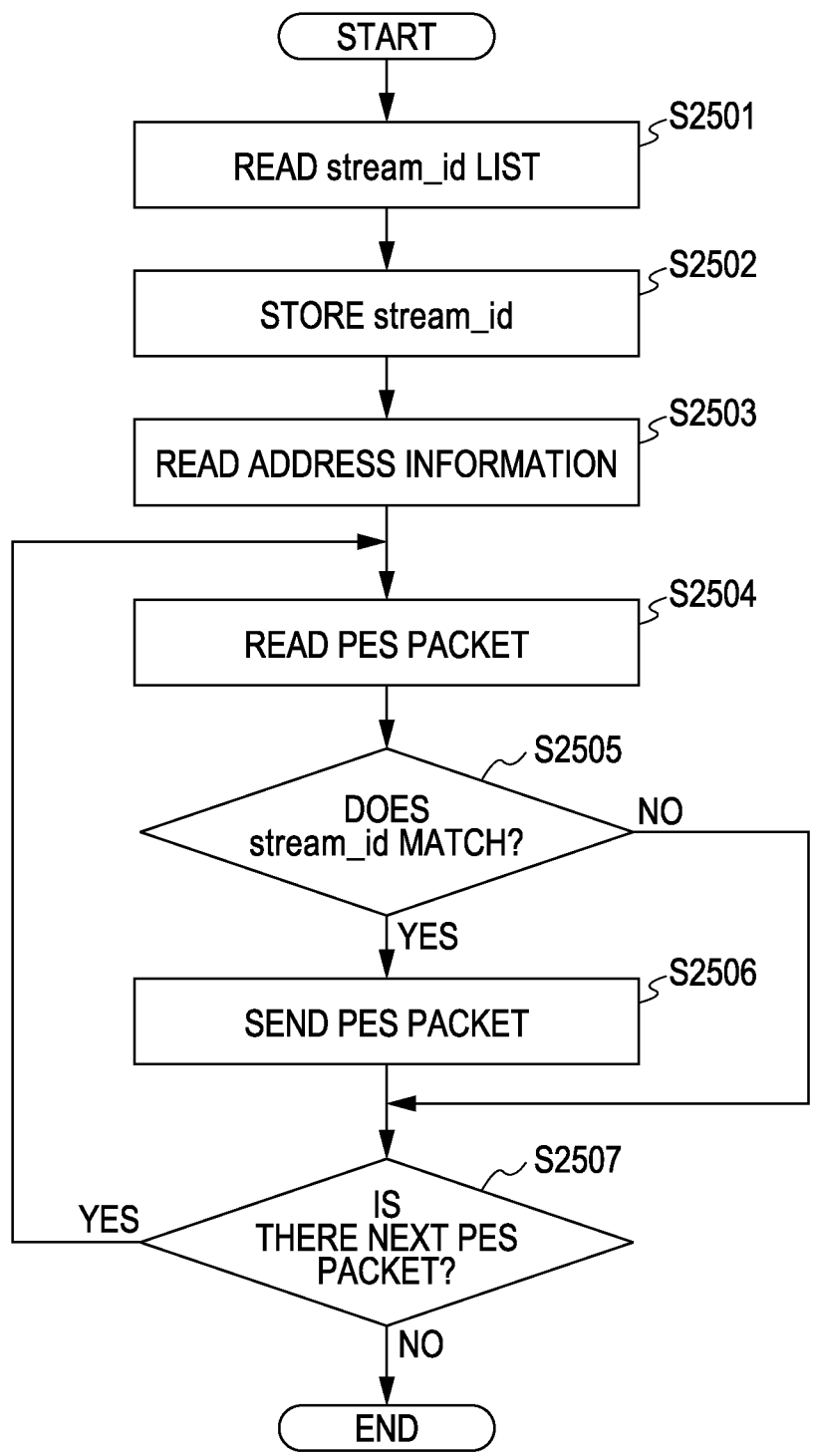
FIG. 25 is a flowchart illustrating processing for sending virtual contents.

Stream transmission processing at the time of playing virtual contents will be described with reference to the flowchart in FIG. 25.

In step S2501, a stream_id list is read out from the virtual contents. Next, in step S2502, the read stream_id is stored in the RAM 104. Then, in step S2503, address information is read out from the virtual contents, and the address of the MPEG stream which is the actual contents is obtained. In step S2504, a PES packet is read out from the MPEG stream which is the actual contents.

In step S2505, a comparison is made whether the stream_id stored in step S2502 and the stream_id of the PES packet read out in step S2504 match. In the event that there is a match, the flow proceeds to step S2506, where the PES packet read in step S2504 is sent to the reception apparatus, and then the flow proceeds to step S2507. In the event that the stream_ids do not match, the flow proceeds directly to step S2507.

In step S2507, a check is made whether there is a next PES packet. In the event that there is a next PES packet in the MPEG stream which is the actual contents, the flow returns to step S2504. Otherwise, the processing ends. Per the above-described processing, PES packets matching video stream_ids and audio stream_ids registered in the stream_id list of virtual contents can be extracted from the MPEG stream and transmitted. Thus, according to the present embodiment, a combination of one each of video data and audio data making up a stream can be sent to a reception apparatus within a network conformant to a predetermined standard guideline as a single stream.

In a fourth embodiment of the present invention, a description will be made regarding a case of applying the present invention to a stream having a PID of an EIT (Event Information Table), described in FIG. 26, in addition to the PAT and PMT described in the first embodiment. An EIT includes information such as the name of the stream, description of what is in the stream, etc.

FIG. 27 illustrates a configuration example of an MPEG-2TS with an EIT. FIG. 27 is the same configuration as in FIG. 24 but with the EIT added.

FIG. 28 illustrates an example of an EIT. A program title 2801 is "Movie AAA", which is the name of the MPEG-2TS. A component_tag 2802 is a number assigned to each elementary stream making up the MPEG-2TS. Text information 2803 is text information for describing what is in each elementary stream, in this case "Angle 1", "Angle 2" "Japanese", and "English".

FIG. 29 illustrates an example of a PMT. The configuration shown in FIG. 29 is the same as that in FIG. 5B, but with the component_tag 2901 added. Note that the component_tag 2802 and the component_tag 2901 are correlated, with the same component_tag values indicating information relating to the same elementary stream. Accordingly, the elementary stream of PID=0x0081 has component_tag value=0x00, and further text information of "Angle 1". In the same way, the elementary stream of PID=0x0082 has component_tag value=0x01, and further text information of "Angle 2". The elementary stream of PID=0x0083 has component_tag value=0x10, and further text information of "Japanese". The elementary stream of PID=0x0084 has component_tag value=0x11, and further text information of "English".

FIG. 30 shows a content list 3000 in a case of having created titles of virtual contents based on the text information of the EIT. The process of creating the virtual contents follows the procedures described in the first embodiment.

Information of content items 3001 through 3005 is set in the content list 3000, with only the titles of the content items differing from those in the content list 1500.

The title of the content item information 3001 is "Movie AAA". The title of the content item information 3002 is "Movie AAA (Angle 1: Japanese)". The title of the content item information 3003 is "Movie AAA (Angle 1: English)". The title of the content item information 3004 is "Movie AAA (Angle 2: Japanese)". The title of the content item information 3005 is "Movie AAA (Angle 2: English)".

Procedures for creating a title of a content item will be described with reference to the flowchart in FIG. 31. The flowchart in FIG. 31 is the same as that in FIG. 7, except that the EIT processing procedure and title creating procedure have been added. Accordingly, procedures which are the same are denoted with the same step numbers and their descriptions are omitted herein.

In step S3101, the PID of the TS packet read out in step S701 is determined, and in the event that the value which the PID shows indicates an IET, the flow proceeds to step S3102 where the EIT data is stored in the RAM 104. In the event that the value which the PID shows does not indicate an IET, the flow proceeds to step S705.

In step S3103, the PMT data shown in FIG. 29 is stored in the RAM 104. The data format used for storing is different from that in step S708, and step S3103 is processing which replaces that of step S708.

In step S3104, a title is created based on the PMT stored in step S3103, the PMT created in step S709, and the EIT stored in step S3102.

Next, the procedures for creating a title will be described with reference to the flowchart in FIG. 32.

In step S3201, PIDs are read out form the PMT created in step S709. For example, in the case of PMT 1001, PID=0x0081 and PID=0x0083 are read out.

In step S3202, component_tags of PIDs matching the PIDs read out in step S3201 are read out from the PMT stored in step S3103. For example, in the case of the PMT shown in FIG. 29, the component_tag=0x00 of PID=0x0081 and the component_tag=0x10 of PID=0x0083 are read out.

In step S3203, the program title is read out from the EIT stored in step S3102. Further, text information of the component_tag matching the component_tag read out in step S3202 is read out. For example, in the case of the EIT in FIG. 28, "Movie AAA" is read out as the program title. Further, "Angle 1" of the component_tag=0x00 and "Japanese" of the component_tag=0x10 are also read out.

In step S3204, the title of the virtual contents including the PMT 1001 is created based on the program title and text information read out in step S3203. For example, if a title is created in the format of "program title (text information of video data: text information of audio data)", the title created would be "Movie AAA (Angle 1: Japanese)".

In step S3205, a determination is made whether there is another created PMT. In the event that there is another created PMT, the flow returns to step S3201 and processing of other PMTs begins. For example, the same processing is performed for PMTs 1002 through 1004, and titles are created for each of the virtual contents. These titles are then used as titles of the content items in the content list, whereby the content list 3000 can be created. Thus, with the present embodiment, what is in virtual contents can be presented to the reception apparatus 109 in an easily-understandable manner by creating titles of content times using text information obtained from information making up the stream.

While the above embodiments have been described with reference to examples wherein the CPU 102 executes multiple types of processing following programs stored in the ROM 103 of the information distribution apparatus 101, the present invention is not restricted to this example. For example, the multiple types of functions (processing) performed by the CPU may be shared among multiple processing units such that each processing unit handles one type of function. Further, multiple processing units may share and handle a single type of function (processing). In this case, programs which are necessary of the programs stored in the ROM would need to be held by each of the multiple processing units for each to perform processing independently. There also may be cases where each processing unit would be formed as a hardware circuit. The present invention also encompasses such various modifications.

Also, while the above embodiments have been described with reference to examples wherein an MPEG stream stored in the hard disk 106 beforehand is scanned to create virtual contents (combination information), MPEG streams regarding which virtual contents can be created are not restricted to such, and for example may be MPEG streams input from another information distribution apparatus (not shown) via the network controller 107. In such a case, scanning can be performed at the time of storing the input MPEG stream to the hard disk 106 to create virtual contents.

Further, the present invention is not restricted to only the apparatuses and methods for realizing the above-described embodiments. For example, an arrangement wherein software program code for enabling a computer (CPU or MPU) within such a system or apparatus to realize the above embodiments is supplied thereto is also within the scope of the present invention. Also, cases wherein a computer of such a system or apparatus follows the program code to operate devices so as to realize the above embodiments are also within the scope of the present invention.

In this case, the program code of the software itself realizes the functions of the above-described embodiments. That is to say, the program code itself, and means for supplying the program code to the computer, specifically storage media storing the program code, is also within the scope of the present invention. Examples of such storage media storing the program code include floppy disks, hard disks, optical discs, magneto-optical disks, CD-ROM, DVD, magnetic tape, non-volatile memory cards, ROM, and so forth.

Further, the present invention is not restricted to the functions of the above embodiments being realized by various devices being controlled following the program code alone. For example, cases wherein the program code operates cooperatively with the operating system running on the computer or other application software or the like so as to realize the embodiments are also within the scope of the present invention.

Moreover, cases wherein the program code is stored in memory provided to a function expansion board of the computer and a CPU or the like provided to the function expansion board performs part of all of the actual processing based on instructions of the program code are also within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-051576 filed Mar. 1, 2007, which is hereby incorporated by reference herein in its entirety.

What is claimed is:

1. An information distribution apparatus comprising:
a creating unit configured to, based on a stored content including video data, first audio data and second audio data, create first information which includes an identification of the video data and an identification of the first audio data and excludes an identification of the second audio data, and second information which includes an identification of the video data and an identification of the second audio data and excludes an identification of the first audio data;
a receiving unit configured to receive a request to search contents matching a search condition from a reception apparatus; and
a transmission unit configured to transmit a content list which includes the first information as first content information indicating a first content which includes the video data and the first audio data and excludes the second audio data, and the second information as second content information indicating a second content which includes the video data and the second audio data and excludes the first audio data to a reception apparatus if the first content and the second content match the search condition of the request received by the receiving unit.

2. The information distribution apparatus according to claim 1, further comprising:
an extracting unit configured to extract the video data and the first audio data from the stored content if the receiving unit receives a request for the first content, and extract the video data and the second audio data from the stored content if the receiving unit receives a request for the second content;
wherein, the transmission unit transmits extracted video data and audio data as a single content.

3. The information distribution apparatus according to claim 1, wherein the stored content forms an MPEG-2 transport stream.

4. The information distribution apparatus according to claim 1, further comprising a determination unit configured to determine a configuration of the stored content from a stream_id and presentation time stamp.

5. The information distribution apparatus according to claim 1, wherein the first information and the second information include address information pointing to the video data and the audio data.

6. The information distribution apparatus according to claim 1, further comprising:
a determination unit configured to scan the stored content which has been stored in a storage unit and determines whether the stored content includes multiple types of video data or multiple types of audio data.

7. The information distribution apparatus according to claim 1, further comprising:
a storage unit configured to store a third content which excludes multiple types of video data and excludes multiple types of audio data,
wherein, the creating unit creates, based on the stored third content, third information which includes an identification of the video data in the third content and an identification of the audio data in the third content, and
the transmission unit transmits the content list including the first content information, the second content information and the third information as the third content information indicating the third content to a reception apparatus if the first content, the second content and the third content match the search condition of the request received by the receiving unit.

8. The information distribution apparatus according to claim 1, wherein the first information and the second information are program map tables.

9. A method for distributing information, the method comprising:
creating, based on a stored content including video data, first audio data and second audio data, first information which includes an identification of the video data and an identification of the first audio data and excludes an identification of the second audio data, and second information which includes an identification of the video data and an identification of the second audio data and excludes an identification of the first audio data; and
receiving a request to search contents matching a search condition from a reception apparatus; and
transmitting a content list which includes the first information as first content information indicating a first content which includes the video data and the first audio data and excludes the second audio data, and the second information as second content information indicating a second content which includes the video data and the second audio data and excludes the first audio data to a reception apparatus if the first content and the second content match the search condition of the request received at the receiving step.

10. The method according to claim 9, further comprising:
storing a third content which excludes multiple types of video data and excludes multiple types of audio data,
creating, based on the stored third content, third information which includes an identification of the video data in the third content and an identification of the audio data in the third content, and
transmitting the content list including the first content information, the second content information and the third information as the third content information indicating the third content, to a reception apparatus if the first content, the second content and the third content match the search condition of the request received at the receiving step.

11. A non-transitory computer-readable storage medium storing computer-executable process steps, the computer-executable process steps causing a computer to execute the following steps:
creating, based on a stored content including video data, first audio data and second audio data, first information which includes an identification of the video data and an identification of the first audio data and excludes an identification of the second audio data, and second information which includes an identification of the video data and an identification of the second audio data and excludes an identification of the first audio data; and
receiving a request to search contents matching a search condition from a reception apparatus; and
transmitting a content list which includes the first information as first content information indicating a first content which includes the video data and the first audio data and excludes the second audio data and the second information as second content information indicating a second content which includes the video data and the second audio data and excludes the first audio data to a reception apparatus if the first content and the second content match the search condition of the request received at the receiving step.

* * * * *